US007139820B1

(12) United States Patent
O'Toole, Jr. et al.

(10) Patent No.: US 7,139,820 B1
(45) Date of Patent: Nov. 21, 2006

(54) METHODS AND APPARATUS FOR OBTAINING LOCATION INFORMATION IN RELATION TO A TARGET DEVICE

(75) Inventors: James W. O'Toole, Jr., Somerville, MA (US); Gang Lu, Framingham, MA (US)

(73) Assignee: Cisco Technology, Inc., San Jose, CA (US)

( * ) Notice: Subject to any disclaimer, the term of this patent is extended or adjusted under 35 U.S.C. 154(b) by 771 days.

(21) Appl. No.: 10/083,326

(22) Filed: Feb. 26, 2002

(51) Int. Cl.
*G06F 15/173* (2006.01)

(52) U.S. Cl. ............... 709/223; 701/213; 701/214; 701/215; 701/216

(58) Field of Classification Search ........ 709/223–225; 342/357.06–357.35; 701/207–216
See application file for complete search history.

(56) References Cited

U.S. PATENT DOCUMENTS

| | | | |
|---|---|---|---|
| 5,581,261 A * | 12/1996 | Hickman et al. ............ 342/385 |
| 5,771,280 A * | 6/1998 | Johnson ............... 379/93.23 |
| 6,188,719 B1 * | 2/2001 | Collomby ............... 375/211 |
| 6,327,535 B1 * | 12/2001 | Evans et al. ............ 701/300 |
| 6,459,989 B1 * | 10/2002 | Kirkpatrick et al. ........ 701/215 |
| 6,608,556 B1 * | 8/2003 | De Moerloose et al. .... 340/501 |
| 6,661,372 B1 * | 12/2003 | Girerd et al. .......... 342/357.12 |
| 6,665,611 B1 * | 12/2003 | Oran et al. .............. 701/213 |
| 6,694,142 B1 * | 2/2004 | Kuwahara et al. ......... 455/456.1 |
| 6,748,318 B1 * | 6/2004 | Jones .................. 701/201 |
| 6,757,740 B1 * | 6/2004 | Parekh et al. ............. 709/245 |
| 6,823,189 B1 * | 11/2004 | Akhteruzzaman et al. ................. 455/456.1 |
| 2001/0041576 A1 * | 11/2001 | I'Anson et al. ............. 455/456 |
| 2002/0094820 A1 * | 7/2002 | Keranen et al. ............ 455/456 |
| 2002/0164996 A1 * | 11/2002 | Dorenbosch ............. 455/456 |

* cited by examiner

*Primary Examiner*—Bunjob Jaroenchonwanit
*Assistant Examiner*—Duyen Doan
(74) *Attorney, Agent, or Firm*—Chapin IP Law, LLC; Barry W. Chapin, Esq.

(57) ABSTRACT

Mechanisms and techniques provide a system for obtaining and providing location information related to a target device. The system transmits a location request message onto a network towards a target device. Each node in a network, possible including the target device, can respond with a location signature message containing location information associated with a plurality of different location information services. Each location information service provides location information having a different location granularity in relation to the target device. The system processes the location information for at least one of the location information services in the location signature message to derive a location of the target device in relation to at least one desired location granularity. By receiving location information of different types and different location granularities from different nodes in the network, and possibly from the target device, a location requesting application can derive an accurate location of the target device.

25 Claims, 8 Drawing Sheets

| 160 LOCATION REQUEST MESSAGE ||||
|---|---|---|---|
| 310 LRM IDENTIFIER (E.G., TCP PORT, FLAG, ETC.) | 311 SOURCE ADDRESS (E.G., LOC. REQ. DEVICE) | 312 DEST. ADDRESS (E.G., TARGET DEVICE IDENTIFIER) | 313 LOCATION INFORMATION DESTINATION (E.G., LRD, BEACON, TARGET) |
| 314 TIME TO RETURN (E.G., TTL OR REV. TTL) | 315 COMBINE OR SEPARATE LSM | 316 LOCATION INFORMATION PARAMETERS (X1, X2, X3...XN) | 317 LOCATION INFORMATION MODIFICATION FACTORS (F1,F2,F3...FN) |

FIG. 4

| 162 LOCATION SIGNATURE MESSAGE |||||
|---|---|---|---|---|
| 320 LSM IDENTIFIER (E.G., TCP PORT, FLAG, ETC.) | 321 SOURCE ADDRESS (E.G., TARGET DEVICE, NODE) | 322 DEST. ADDRESS (E.G., LOC. REQ. DEV., NEXT HOP NODE, BEACON) | 323 LOCATION INFORMATION DESTINATION (E.G., L.R.D.) | 324 LOC. REQUESTING DEVICE |
| 325 COMBINE OR SEPARATE LSM | 326 LOCATION INFORMATION VALUES (Y1, Y2, Y3...YN) | 327 LOCATION INFORMATION PARAMETERS (X1, X2, X3...XN) | 328 LOCATION INFORMATION MODIFICATION FACTORS (F1,F2,F3...FN) | |

FIG. 5

METHODS AND APPARATUS FOR OBTAINING LOCATION INFORMATION IN RELATION TO A TARGET DEVICE

BACKGROUND OF THE INVENTION

Computer networks such as the Internet allow users of computer systems to operate software applications that support the exchange of many types of information. As an example, a user of a portable computer system such as a laptop or handheld computerized device can operate a web browser software application as a client to communicate with web server computer systems on the Internet for access various types of information. The web server computer system may return web pages or other data to the client in response to receiving user requests for such data. Some web-based applications rely on the ability to obtain location information concerning a physical or geographical location of the client and/or server computer systems.

As a specific example, a user of a web browser may navigate to a web site on the world wide web that provides mapping information in order to obtain a geographical map that illustrates the surrounding area (i.e., the physical or geographical surroundings) of the user of the client computer system. To obtain location information related to the client, the web server may send a request to the web browser client prompting the user to enter location information concerning that user's specific location so that the mapping web server can return a map that corresponds to that users location. Upon receiving the location information entered by the user, the web server can access the mapping database to produce and serve a map back to the user's web browser identifying the geographical features relevant to user's location based on the location information provided by the user. As an example, the web server may prompt the user for a zip code in which that user is currently located. In response to receiving the zip code, the web server can serve a map of the town to which that the zip code is related.

Certain types of computer network applications can automatically retrieve location information concerning a location of a target device such as the client computer system in the example above. As another example, some computerized devices can be equipped with a Global Positioning System (GPS) receiver that monitors satellite transmissions of GPS satellites in order to perform a triangulation calculation to determine accurate latitude, longitude and altitude locations of the device that contains the GPS receiver. The computerized device may operate a software application that can respond to requests from a remote computer system for information concerning the GPS position of the computerized device. Such requests may be received, for example, over a wireless network. A specific example of such a device location tracking system exists in the shipping and freight industry. Mobile freight carriers such as tractor-trailer trucks can be equipped with the aforementioned computerized devices and GPS receivers. Such computer systems can report location information concerning the exact position of the freight carrier on route to delivery of freight to a particular destination.

SUMMARY OF THE INVENTION

Conventional techniques that allow a remote computer system such as a server on a computer network (either physical, wireless or a combination thereof) to obtain location information related to a target device such as a client computer system suffer from a number of deficiencies. For instance, using the aforementioned example of retrieving GPS location information from a mobile computing device, an operator of the mobile computing device might intentionally or accidentally modify the location information returned to the location requesting device in order to mask or hide or misrepresent the true location of the target mobile computing device. Alternatively, this location information may be pre-configured but then become out of date if the device is moved but the location information is not updated. Since the location requesting device is limited to retrieving location information only from the target device itself and must rely on the accuracy of this location information, opportunities arise for inaccuracies to occur in the location information provided by the target device to the location requesting device.

As another example, consider an application that requires the zip code of a particular client device in order to provide a map of the area surrounding that client device. The user of the client device, during an initial configuration procedure, may configure the client device with a zip code that initially correctly identifies the location of the client device at that time. The client device may then communicate this zip code location information to a server device for future use. The server device might encode the zip code into a token such as a cookie that the server device can then return to the client device for storage within the client device. Thereafter, when the user of the client device operates the client device to receive location specific information such as a map, the server device can obtain the location of the client device by retrieving the cookie that was previously stored within the client device and which contains the encoded zip code information for that client. The server device may utilize this zip code information, for example, to provide targeted advertising back to the client device for merchants located within the zip code region in which the client device is residing.

A problem arises in such conventional systems however since the client device such as a personal computer may be physically relocated to a new geographical position for which the zip code information stored within the client device is no longer accurate. As an example, the client computer device may be a laptop computer that is transported to different parts of the country. If a server device with which this client computer system communicates relies on location information pre-configured into the client computer system, such location information can quickly become obsolete, requiring the user of the computer to frequently update the location information such as the zip code in which the client device currently resides. Further still, the user of the client device may not be aware of the correct location information such as a current zip code which is to be entered into the client device in order to properly identify the location of the client device to the server device that requires such information.

Another deficiency of conventional systems for determining location information related to a target device to that such systems are only capable of determining location information having specific location granularity. As an example, zip code location information provides a location granularity that is approximately equal to the regional areas defined by different zip codes such as individual towns, counties or cities. If a software application operating in a remote server computer system requires location information having a different location granularity than zip code information, conventional techniques for obtaining location information are unable to provide location information of varying location granularities. Perhaps the application operating in the server computer system requires location information of a coarser or finer location granularity than zip code information. As an example of such a requirement, suppose a client device is equipped with a global positioning receiver that can provide extremely precise location information. In other words, the location information has a very fine location granularity. A software application operating in a location requesting device such as a server computer system may be ill-equipped to process GPS receiver signal information and may instead require location information having a much coarser location granularity, such as the identity of the state in which the client device is currently positioned. Though the identity of the state in which a client device resides may be derivable from GPS coordinate information using location correlation techniques, the server computer system would have to be equipped with specialized logical processing for converting GPS coordinates to a specific state.

Stated more generally, conventional systems for providing or retrieving location information concerning the location of a target device suffer in that such systems generally provide location information having a single location granularity and such systems generally rely on the accuracy or authenticity of such location information.

In contrast to the aforementioned conventional systems for determining location information concerning a target device, embodiments of the invention provide mechanisms and techniques for collecting location information that is related to a target device from a plurality of different sources and that may include a plurality of different types of location information having different location granularity. As an example, according to one embodiment of the invention, a location requesting device such as a web server can create and forward a location request message onto a network. The location request message contains a specification (e.g., a request) of different types of location information that the location requesting device desires to receive in relation to a target device (e.g., located elsewhere on the network). As the location request message propagates through the network, each node in the network that receives the location request message can forward the location request message further toward its destination which can be, for example, the target device itself.

Upon reaching the target device, the target device can operate a location manager process that can create a location signature message in response to the location request message. By analyzing the location request message for the different types of location information requested by the location requesting device, the target device can access various location information services to obtain each type of requested location information. Once the target device obtains all accessible location information, the target device can package or encapsulate the requested and accessible location information into the location signature message that it can then forward onto the network for return, in one embodiment, to the location requesting device.

In one embodiment, as the location signature message propagates toward the location requesting device, each node on the network equipped with an embodiment of the invention that receives the location signature message can detect and analyze the location signature message to determine what different types of location information are requested by the location requesting device. As an example, "location" information may be names and/or network addresses of routers, switches, or other network-infrastructure devices, which by themselves may not indicate specific locations but that can enable the location requesting device to bunch or classify node and/or the target device client according to one or more network characteristics that those nodes have in relation to other closely-affiliated routers or switches as evidenced by the location signature messages.

Based on this analysis, each node can also attempt to access all of the different types of requested location information for which that node has access to from respective location information services that are capable of providing the requested location information. Once a node has obtained the requested location information, the node can append or add-in its location information of different types and different location granularities into the location signature message and can forward the location signature message back onto the network for further propagation towards the location requesting device. Each node in the network equipped with an embodiment of the invention can perform this technique such that by the time the location signature message reaches the location requesting device, it will contain location information for each node in the network, and possibly for the target device (as will be explained), for each type of location information service that is accessible to that node or by the target device. As a result, the location requesting device can thereafter perform analysis processing on the different types of location information to provide location verification of a position of the target device according to a desired level of location granularity or to obtain location information of different (i.e., multiple) location granularities depending upon the intended purpose or use of the location information.

As an example, location information returned within a location signature message can include such things as network addressing information, postal addressing information such as zip codes, street numbers and names, names of cities and towns, counties, states, countries and the like. Other types of location information can include phone number information, GPS information, network routing metric information, and so forth. Upon gathering location information of the different types and having different location granularities, the location requesting device can gain further insight into the true location of the target device. This information can be cached for future use, or distributed for use by other devices.

It is to be understood that "location information services" can return any type of location information and that location information as used herein does not have to conform to what a person may literally envision as a specific geographic or physical "location." As an example, the location information provided by a location information service might be network hop count, network address information, or bandwidth capabilities between two or more devices in a network. This information may be collected according to the techniques disclosed herein for multiple target devices and may allow a location requesting device to estimate that two clients (i.e., two target devices) are nearby each other because location signature message responses related to those client target devices contain similar location information results, even though the similarity is that, for example, they are both within two hops of a switch with the same unique network address. Accordingly, embodiments of the invention do not require that location information indicate precise information about absolute or physical locations, or even a position relative to a single position such as a globally known beacon device (as will be explained). Rather, the location information can be collected as desired and can be processed as required to indicate or deduce that two devices are probably close to each other based on any number of information sources referred to here as location information sources or services. Generally, a location requesting device as explained herein is thus capable of matching the location information sets within these location signature message responses against each other using techniques such as, for example, clustering or set-cover algorithms to approximately associate one or more devices, such as client target devices, with each other or to a specific location. Other embodiments of the invention will be explained in more detail herein and are summarized below.

More specifically, embodiments of the invention provide mechanisms and techniques for obtaining location information related to a target device. Once such method embodiment comprises the steps of transmitting a location request message onto a network towards the target device. The location request message requests location information in relation to the target device. The method then receives a location signature message. The location signature message contains location information associated with a plurality of different location information services. Each location information service provides location information having a different location granularity in relation to the target device. The method then processes the location information for at least one of the location information services in the location signature message to derive a location of the target device in relation to at least one desired location granularity.

In another embodiment, the location request message contains a specification of location information parameters that identify different types of location information requested by the location request message. Each different type of location information corresponds to location information that can be provided from a different location information service.

In another embodiment, the location request message contains a target device identifier and contains a time to return identifier. In addition, the step of transmitting the location request message comprises the steps of configuring the specification of location information parameters in the location request message to include a specification of a location information parameter for each type of location information that is to be returned in the location signature message from a corresponding location information service. The method calculates a value for the time to return identifier based upon a propagation distance between the location requesting device and the target device. The value for the time to return identifier indicates a metric that determines how close the location request message is propagated in the network towards the target device before a node in the network that receives the location request message cancels propagation of the location request message and produces a location signature message that is returned to the location requesting device. The method also forwards the location request message onto the network towards the target device specified by the target device identifier.

In another embodiment, the step of calculating a value for the time to return identifier comprises the steps of setting the value of the time to return identifier to a total of the propagation distance between the location requesting device and the target device, such that the step of transmitting the location request message onto the network towards the target device causes nodes in the network to propagate the location request message to the target device, and such that the target device creates a location signature message for return to the location requesting device.

In another embodiment, the step of calculating a value for the time to return identifier comprises setting the value of the time to return identifier to be less than a total of the propagation distance between the location requesting device and the target device, such that the step of transmitting the location request message onto the network towards the target device causes nodes in the network to propagate the location request message a distance less than required to reach the target device, and such that a node in the network other than the target device creates a location signature message for return to the location requesting device.

In yet another embodiment, the step of configuring the specification of location information parameters comprises setting a location information parameter for each type of location information that is to be returned, in the location signature message, from a corresponding location information service that is accessible to each node in the network, such that each node in the network that is capable of producing a location signature message containing location information for that location parameter provides such location information in a location signature message in response to receiving the location request message.

In still another embodiment, the location request message includes at least one modification factor corresponding to at least one location parameter in the specification of location information parameters. The modification factor can specify an amount such as a percentage by which a node or the target device is able to distort one or more associated portion of location information so as to somewhat obscure the specific location of that device. This may be desired, for example, for privacy purposes. The step of configuring the specification of location information parameters comprises setting the modification factor(s) corresponding to the location parameter(s) to a value by which a node in the network, that provides location information corresponding to that location parameter in the location signature message, is to modify that location information.

In a further embodiment, the step of receiving a location signature message comprises the step of receiving a location signature message that includes location information that is modified according to the modification factor(s) corresponding to the location parameter(s) associated with that location information.

In another embodiment, the location signature message contains location information inserted into the location signature message from a plurality of different nodes in a communications network, each node having a different location proximity to the target device. This location information may be combined together by the recipient device to generate a location concerning a node such as a target device. The combination of location information may not indicate the precise physical location of the node, but may be used to deduce or indicate another type of location, such as a network location as is the example briefly discussed above.

In another embodiment, the location information inserted into the location signature message is location information obtained from each node i) at which the location request message is received on a network path from the location requesting device to the target device; ii) which is capable of responding to the location request message with a location signature message; and iii) for which location information is accessible by that node from a respective location information service that corresponds to a respective location information parameter specified in the location request message.

In still another embodiment, the step of processing comprises the steps of retrieving, from the location signature message, first location information having a first location granularity in relation to the target device and retrieving, from the location signature message, second location information having a second location granularity in relation to the target device. The method then analyzes the first location information and the second location information to determine a location of the target device based on the first and second location information.

In another embodiment, the location request message includes a specification of location information parameters that identify location information that may be available from location information services to nodes in the network existing on a path between the location requesting device and the target device. The location signature message contains location information corresponding to respective location parameters that have a value indicating that the location requesting device is requesting that location information and for which nodes in the network existing on the path between the location requesting device and the target device are capable of access the location information from a location information service corresponding to the respective location parameters.

In yet a further embodiment, the different portions of location information corresponding to different location information services provide different location granularities with respect to the location of the target device. The different location granularities include at least one of postal address information (e.g., one or more of a zip code, street address, town city, state, country, country, etc.), phone number information, global positioning information, and network location information (e.g., network path, route, default router, bandwidth, quality of service information, hop count to beacon device, etc.).

Other embodiments operate in nodes and/or target devices in a computer network and provide a method for providing location information. One such method comprises the steps of detecting a requirement to provide location information. In some cases, this may be done on behalf of a location requesting device (such as a server device) and in other cases, the location requesting device may be the target device itself. In response to the step of detecting, the method creates a location signature message. The location signature message contains location information associated with a plurality of location information services accessible to the node. Each location information service provides location information having a different location granularity in relation to a target device. The method forwards the location signature message onto the network to a location signature message destination. If the location requesting device is the target device, then the target device can detect a requirement of its own to obtain location information.

In another embodiment, the step of detecting the requirement to provide location information comprises the step of receiving, on the network, a location request message containing a specification of location information parameters that identify different types of location information, that can be provided from different location information services, and which, if accessible to the node, are to be inserted into a location signature message for forwarding onto the network to the location signature message destination.

In another embodiment, the location request message contains a target device identifier and contains a time to return identifier and the step of receiving a location request message comprises the steps of adjusting a value of the time to return identifier in the location request message and determining if the value of the time to return identifier indicates that the location request message has propagated on the network far enough towards the target device. If the value of the time to return identifier indicates that the location request message has propagated on the network far enough towards the target device, the method cancels propagation of the location request message towards the target device. If the value of the time to return identifier indicates that the location request message has not propagated on the network far enough towards the target device, the method forwards the location request message onto the network towards the target device specified by the target device identifier.

In another embodiment, the step of receiving, on the network, a location request message comprises the steps of detecting that the location request message includes an indication that separate location signature messages are to be sent to the location signature message destination, and in response to the step of detecting, the method forwards the location request message onto the network towards the target device specified by the target device identifier and proceeds to process the steps of creating a location signature message and forwarding the location signature message onto the network to a location signature message destination, such that the location signature message destination receives a separate location signature message from each node that detects a requirement to provide location information.

In another embodiment, the step of detecting the requirement to provide location information comprises the step of receiving a first location signature message, the first location signature message containing a specification of location information parameters that identify different types of location information, that can be provided from different location information services, and which, if accessible to the node, are to be inserted into the location signature message created in the step of creating for forwarding onto the network to the location signature message destination.

In another embodiment, the first location signature message includes first location information. Also, the step of creating a location signature message comprises the step of obtaining second location information from each accessible location information service specified by a location information parameter in the specification of location information parameters contained in the first location signature message. The method also combines the first location information from the first location signature message and the second location information into a second location signature message, such that the second location signature message contains location information in relation to the target device from the node and at least one previous node on a network path towards the location signature message destination.

In a further embodiment, the step of creating a location signature message comprises the steps of obtaining location information relative to the node from each accessible location information service specified in a specification of location information parameters and inserting the location information from each accessible location information service into the location signature message.

In another embodiment, the step of inserting comprises the steps of placing an identity of the node into the location signature message in order to associate the location information obtained by the node for all location information services accessible to the node with the identity of the node.

In another embodiment, the location information obtained from each location information service corresponds to location information obtained from those location information services that are accessible to the node for each respective location information parameter specified in a specification of location information parameters.

In another embodiment, the location information obtained from different location information services provides a different granularity of location with respect to the location of the node in relation to the target device.

In another embodiment, the step of inserting the location information into the location signature message comprises the steps of obtaining at least one location information modification factor that corresponds to at least one location information service specified in the specification of location information parameters and applying the location information modification factor(s) to corresponding location information obtained from the location information service in order to modify values of the location information from the location information service.

In yet another embodiment, the step of creating a location signature message comprises the steps of associating a node signature to the location information contained in the location signature message such that the identity of the node associated with the location information can be verified by a recipient of the location information.

In other embodiments, a destination of the location signature message is a location requesting device or is a target device or is a beacon device.

Other embodiments of the invention include a computer system, network node, location requesting device, target device, data communications device, or other device configured with software and/or circuitry to process and perform all of the method operations noted above and disclosed herein as embodiments of the invention. In such embodiments, the device comprises at least one communications interface (e.g., a network interface), a memory (e.g., any type of computer readable medium, storage or memory system), a processor and an interconnection mechanism connecting the communications interface, the processor and the memory. In such embodiments, the memory system is encoded with a location manager application (or location requesting application in the case of a location requesting device) that when performed on the processor, produces a location manager process that causes the computer system to perform any and/or all of the method embodiments, steps and operations explained herein as embodiments of the invention. In other words, a computer, switch, router, gateway, network bridge, proxy device or other network device that is programmed or otherwise configured to operate as explained herein is considered an embodiment of the invention.

Other arrangements of embodiments of the invention that are disclosed herein include software programs to perform the method embodiment steps and operations summarized above and disclosed in detail below. As an example, a data communications device software control application, such as a data communications device operating system configured with a location manager that operates as explained herein is considered an embodiment of the invention. More particularly, a computer program product is disclosed which has a computer-readable medium including computer program logic encoded thereon that, when executed on at least one processor with a computerized device, causes the processor to perform the operations (e.g., the methods) indicated herein is considered an embodiment of the invention. Such embodiments of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system, data communications device or other dedicated or general purpose electronic device to cause such a device to perform the techniques explained herein as embodiments of the invention.

The embodiments of the invention may be implemented by computer software and/or hardware mechanisms within a data communications device apparatus. It is to be understood that the system of the invention can be embodied strictly as a software program, as software and hardware, or as hardware and/or circuitry alone. The features of the invention, as explained herein, may be employed in data communications devices and other computerized devices and/or software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

FIG. 4 illustrates an example of the contents of a location request message configured according to one example embodiment of the invention.

FIG. 5 illustrates an example of the contents of a location signature message configured according to one example embodiment of the invention.

DETAILED DESCRIPTION OF EMBODIMENTS

Figure 1:
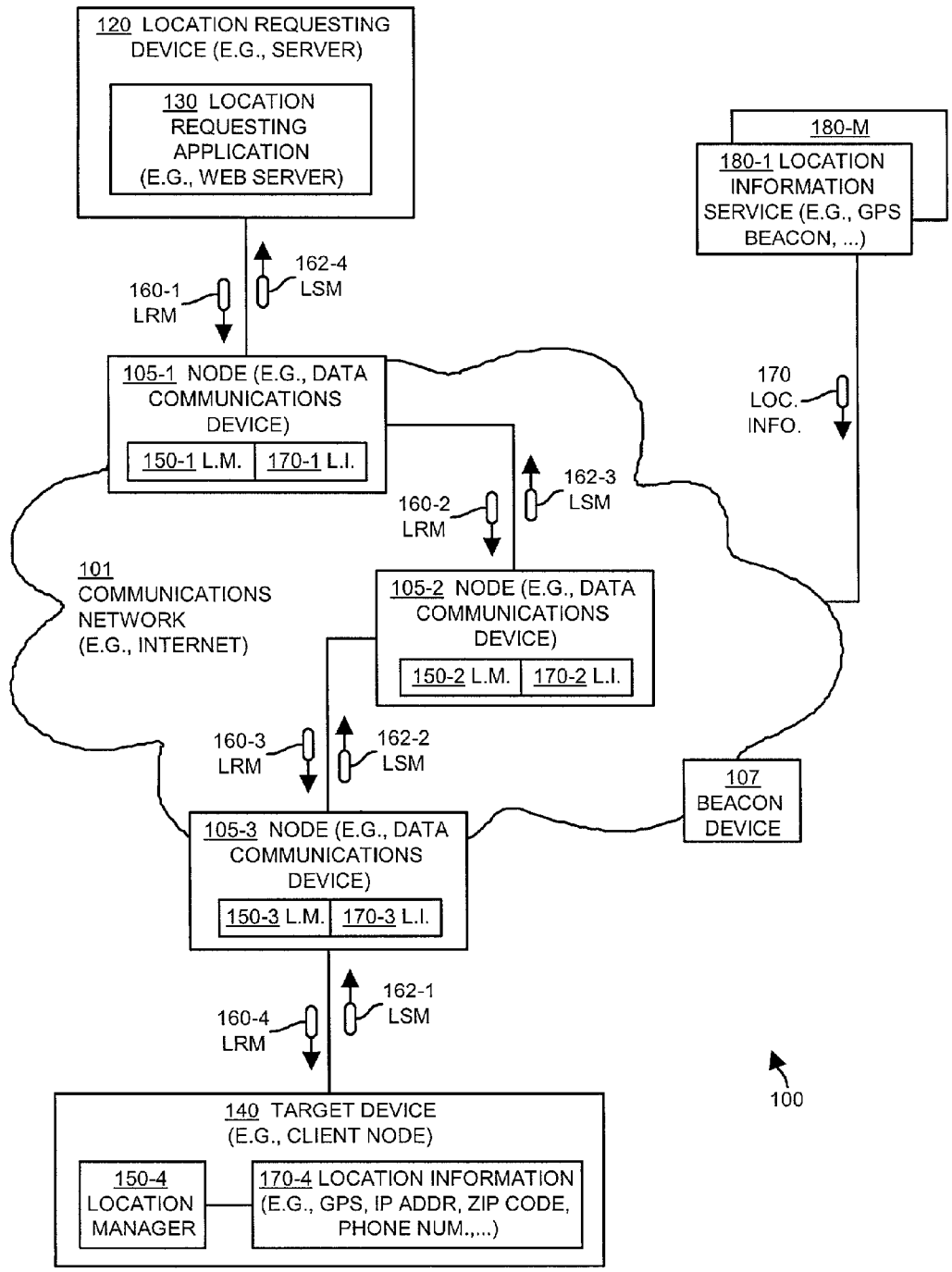
FIG. 1 illustrates an example network configuration that is suitable for use in explaining example embodiments of the invention.

Embodiments of the present invention provide systems, mechanisms and techniques for gathering location information having a plurality of location granularities from a plurality of different location information services in relation to a client or target device. In particular, in operation of a system equipped with embodiments of the invention, a location requesting device such as a web server may desire to obtain location information related to a target device such as a client computer system which is located anywhere on a computer network such as the Internet. The client computer system may be a mobile device coupled via a wireless link or may be physically coupled to the Internet in a local or wide area network configuration.

As a brief example of one operation of one embodiment of the invention, the location requesting device can create a location request message and can forward the location request message onto the network towards the target device (i.e., towards the client computer system). The location request message contains a specification of location information parameters which each identify different types of location information which the location requesting device desires to retrieve in relation to the target device. In some embodiments, as the location request message gets propagated through the network towards the target device, nodes in the network such as data communications devices (e.g., switches, routers, hubs, bridges, gateways, or the like) that receive the location request message can adjust a time to return field within the location request message. The time to return field can indicate a point in propagation of the location request message at which to cancel propagation of the location request message and which to return a location signature message. In some configurations, the location request message can propagate all the way to the target device for receipt by the target device, while in other situations the location request message may only propagate part way towards the target device. As an example, the time to return field can be compared in each node that is equipped with an embodiment of the invention to determine if a message is within a certain network hop count of a specific address in a network. If so, then the time to return field has expired and the node equipped with the invention that is processing the message can take further action as explained herein.

Upon completion of propagation of the location request message through the network, the last device to receive the location request message (which may be a node in the network on a path from the location requesting device to the target device or which may be the target device itself) examines the location request message and obtains location information for each location information parameter specified in a specification of location information parameters contained within the location request message. As an example, the location request message may contain location information parameters for GPS information, zip code or other physical address information (e.g., city, street, town, state, country, etc.), network address or routing information (e.g., IP addresses, network hop counts, etc.), phone number information, and so forth. Each of these different types of location information can be identified with a parameter in a specification of location information parameters within the location request message. Each of such parameters represents a specific type of location information having a specific location granularity that the location requesting device desires to receive from nodes (and possibly the target device) in the network capable of accessing such location information from a location information service that can provide such information.

As an example, one location information parameter may indicate that GPS information from a GPS location information service (i.e., from a GPS receiver that works in conjunction with GPS satellites) is to be received by the location requesting device for each node in the network between the location requesting device and the target device that is capable of accessing such location information. Another location information parameter might indicate that the location requesting device desires to also receive network address or routing information, while another location information parameter can indicate another type of location information that the location requesting device desires to receive.

In one configuration, the last node in the network to receive the location request message (which may be the last node along the route of travel of the location request message towards the target device, which may in fact be the target device itself) obtains all available location information for any accessible location information services (i.e., for such services which that particular device is able to access) and then inserts this collective set of location information into a location signature message that this device creates and returns towards the location requesting device (or towards another destination as will be explained).

Depending upon which embodiment of the invention is in use, the node may also obtain location information modification factors from the location request message. Location information modification factors represent fuzz, noise or distortion components that are to be applied to specific portions of location information returned from corresponding location information services. Such factors can be applied prior to placing such location information into the location signature message. That is, the location request message can contain a specification of specific types of location information that are to be obtained from various location information services and can also specify noise or modification factors that are to be applied to the location information returned from the services prior to return the location information to location requesting device.

One purpose of the location information modification factors is to impose or allow for a minimal amount of privacy when reporting the location information concerning a particular target device. As example, since GPS location information provides an extremely precise or pinpoint location of a client device, a location information modification factor may be included within the location request message that specifies that all GPS location information is to be modified (i.e., by each node or by the target device) by up to ⅛ of a mile in accuracy prior to placing such GPS location information into a location signature message for return to the location requesting device.

Once the node has gathered the entire set of location information for each location information parameter and has placed such location information into a location signature message, the node can also include a copy of the specification of location information parameters within the location signature message and can optionally digitally sign the location signature message for verification by a receiving node. Once the location signature message is complete (i.e., contains the requested location information from all available location information services), the node transmits the location signature message towards a location information destination.

In one embodiment of the invention, the location signature message is propagated back towards the location requesting device (e.g., node by node). As the location signature message travels to each node in the network along the path back to the location requesting device, each node capable of performing the location information processing explained above (i.e., each node that recognizes the message as a location signature message) can perform similar processing as previously explained with respect to the first node that created the location signature message in order to add-in location information of its own for each request location information service. That is, in one embodiment of the invention, each node which receives a location signature message can also gather location information from each accessible location information services specified by some (e.g., node-specific) or all location information parameters. This collective set of location information will provide location information of different types and different location granularities for the current node that is currently processing the location signature message. This set of location information related to this node can also be included or placed within the location signature message in addition to existing location information already present in the location signature message. As such, the location signature message now contains location information for the current node as well as any previous nodes through which the location signature message has traveled, and can now be propagated further towards the location requesting device.

One embodiment of the invention causes a single location signature message to be propagated through each node back towards the location requesting device. Each node that receives the location signature message can append or otherwise insert additional location information into the location signature message for any different types of location information to which that node has access. In this manner, the location signature message grows and grows and is eventually received by the location requesting device. This message now contains sets of location information for each node in the network which received the location signature message en route back to the location requesting device from the original node to which the location request message had traveled. The collective sets of location information contained within the location signature message from each node (i.e., appended into this message from each node capable of the processing explained herein) provide a large amount of location information to the location requesting device which can process such information as required to provide a more accurate determination of the location of the target device to which the location request message was directed or to obtain different types of location information or to obtain location information of different location granularities (or any combination thereof).

As an example, if the location request message propagated all the way to the target device, the target device is the initiator of the first location signature message that contains location information from all location information services available or accessible to that target device for each location information parameter specified in the location request message. This location signature message is then propagated back towards the location requesting device. At the first hop in the network away from the target device (i.e., an edge device such as cellular or wireless base station or tower, encountered during propagation back towards the location requesting device) that recognizes the location signature message, this first-hop node will append a set of location information for all location information services which that node itself can access, as specified by each location information parameter (the location signature message includes a copy of these parameters in one embodiment).

Accordingly, if inaccuracies exist within the location information provided in the location signature message created by the target device (e.g., the target device reports a zip code, phone number or other information for another part of the country in which that target device is not actually located), the second set of location information provided by the next node after the target device that processes the location signature message can be used by the location requesting device to verify or correct the accuracy of the location information provided by the target device.

As another example, if the target device were a wireless device and the fist hop node back towards the location requesting device in the network were a wireless base station (e.g., a cellular tower or antenna), chances are likely that the wireless target device and the first hop node (i.e., the wireless base station) are located in rather close geographical proximity to each other, such as being separated by no more than the few miles. If the wireless base station receives the location signature message and provides location information containing a zip code in which the wireless base station is currently located, when the location signature message containing the location information is received in processed by the location requesting device, the location requesting device can make an accurate determination that the zip code information provided by the target device may be erroneous. This determination may be made by the location requesting device by verifying the identity of the first-hop node in the network other than the target device. That is, since the first-hop node is a wireless base-station antenna and it is likely that such network devices are not mobile or relocated often, the location requesting device can rely on the zip code provided by the wireless base-station antenna is being more accurate than the zip code reported in the location signature message by the target device.

The aforementioned example illustrates how an embodiment of the invention allows a location requesting device to more accurately determine a location of the target device such as a client computer system in the network. Another advantage illustrated by the aforementioned example is that embodiments of the invention allow a location requesting device to receive location information of varying location granularities. That is, since each node in the network which is equipped with an embodiment of the invention is requested to return location information from all accessible location information services, each type of location information returned from each location information service provides a different location granularity. Hence, the location requesting device can process the location information according to one of a variety of different location granularities as may be required. It is to be understood that the aforementioned example is given by way of example only and is not meant to be limiting of embodiments of the invention. Further details with respect to other embodiments of the invention will now be discussed with reference to the figures and the following discussion of those figures.

FIG. 1 illustrates a computer network environment 100 suitable for use in explaining example operations of embodiments of the invention. The computer network environment 100 includes a communications network 101 such as the Internet which couples a number of different network nodes 105 (105-1 through 105-3 in this example) as well as a location requesting device 120, a target device 140 and one or more beacon devices 107. One or more location information services 180 (180-1 through 180-M in this example) are available to provide location information 170 to devices within the communications network 101 as will be explained. The communications network 101 may be any type of network such as the Internet or a local or wide area network. The nodes 105 within the communications network 101 may be data communications devices such as routers, switches, gateways, hubs and so forth that allow data communications traffic to be exchanged over the communications network 101.

The target device 140 operates as a client device in this example and represents any type of computer system, computerized device or other electronic device that can communicate with other devices over the network 101. In this example, the target device 140 operates as a client node in the network and operates a location manager 150-1 which has access to location information 170-1. The operation of the location manager 150-1 in relation to the location information 170-1 will be explained in detail shortly. In addition, each of the other nodes 105 within the network 101 also operates a respective location manager 150 which is able to access respective location information 170 within that node 105. For purposes of most of this explanation, the target device 140 will be treated as a node 105.

The location requesting device 120 may be any type of computer system or electronic device which is also capable of communicating over the network 101. The location requesting device 120 operates a location requesting application 130 which may be, for example, a web server or other content serving application. Generally, in operation of the system of the invention, the location requesting application 130 operating within the location requesting device 120 can obtain location information 170 in relation to the target device 140 by creating a location requesting message 160-1 and forwarding the location request message 160-1 onto the network 101 on a path towards the target device 140.

As illustrated in the example in FIG. 1, the location request message 160 propagates through the network 101 towards the target device 140 as a series of location request messages 160-1 through 160-4. The processing of the location request messages 160 within the location requesting device 120 (i.e., the creation of the location request message 160 by the location requesting application 130) as well as within each node 105-1 through 105-3 and within the target device 140 will be explained in more detail shortly. Generally however, the location request message 160-1 identifies various portions of location information 170 that the location requesting application 130 desires to retrieve, if possible, by receiving one or more location signature messages 162. As such, when the location request message 160 propagates through the network 101 to the target device 140, upon reaching the target device 140 (in this example), the location manager 150-1 within the target device 140 collects all location information 170-1 as requested in the location request message 160-4 and returns such location information 170-1 back towards the location requesting device 120 within the location signature message 162-1.

As the location signature message 162 returns through each node 105 on its way back to the location requesting device 120, each node 105-3, 105-2 and 105-1 in the network 101 can recognize or otherwise detect the location signature message 162 and can append or otherwise insert respective sets of obtainable location information 170-3, 170-2, 170-1 into the location signature message (thus forming the various location signature messages 162-2, 162-3 and 162-4). Accordingly, the final location signature message 162-4 received by the location requesting application 130 operating within the location requesting device 120 contains all available location information 170 from each node 105-1, 105-2, 105-3 and the target device 140 that received the location request message 160.

Since the location request message 160 can specify many different types of location information 170 that are to be returned in a location signature message 162, the location requesting application 130 receives sets of location information having different location granularities with respect to the nodes that provided such location information 170. In this manner, the location requesting application 130 can process the collective portions of location information 170 in order to determine a more robust, more accurate and more defined location of the target device 140. In addition, since the location information received has various location granularities, depending upon the purpose of the location requesting application 130, different portions of location information 170 may be used for different purposes. This location information may be combine together by the recipient device to generate a location concerning a node such as a target device. The combination of location information may or may not indicate the precise physical location of the node, but may be used to deduce or indicate another type of location, such as a network location. As an example, if a location information parameter indicates that a default router is to be indicated within each node that processes a location signature message 192, the two nodes that are nearby to each other might report the same default router. So from a network perspective, location information might indicate network locations of node relative to each other, to target devices, to beacon devices, or other such locations.

Figure 2:
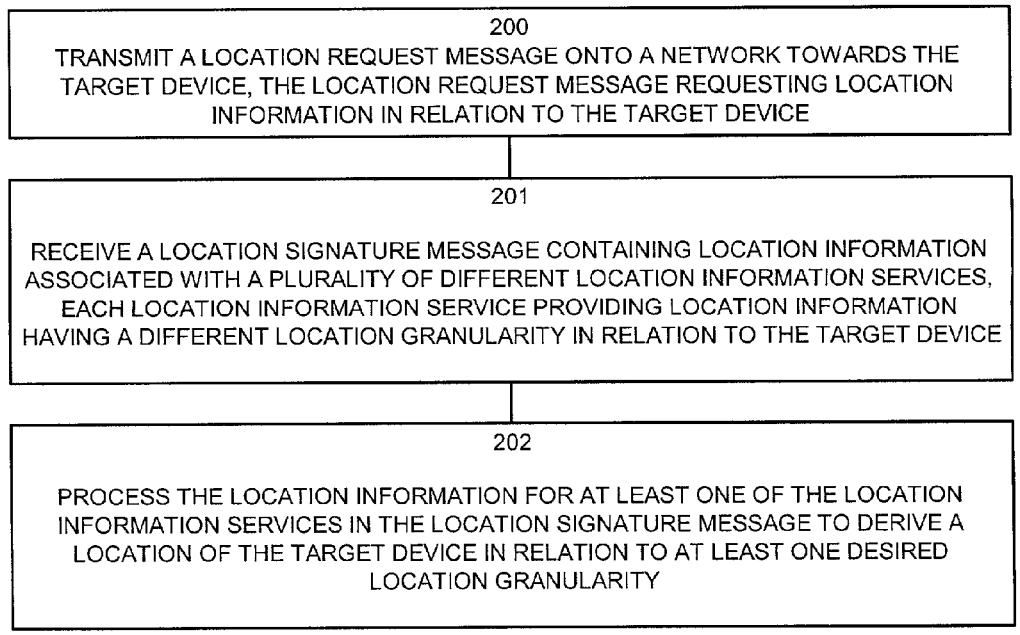
FIG. 2 is a flow chart that shows the high-level processing steps of a location requesting device configured according to one example embodiment of the invention.

FIG. 2 illustrates a high-level flow chart of processing steps performed by a location requesting device 120 configured according to one embodiment of the invention. For discussion of this embodiment of the invention, the processing steps shown in FIG. 2 will be discussed as being performed by the location requesting application 130 operating within the location requesting device 120 is illustrated in the configuration in FIG. 1.

In step 200, the location requesting device 120 transmits a location request message 160 onto the network 101 towards the target device 140. The location request message 160 requests location information 170 in relation to the target device 140 from nodes 105 along the path towards the target device 140 which may be inclusive of the target device 140 itself.

In step 201, at some time after forwarding the location request message 160 onto the network, the location requesting application 130 operating within the location requesting device 120 receives a location signature message 162 (one or more) that contains location information 170 associated with a plurality of different location information services 180. Each location information service 180 (180-1 through 180-M in FIG. 1) provides location information 170 having a different location granularity in relation to the target device 140. For purposes of embodiments of the invention, the location information services 180 may be any type of services, databases, preconfigured information, accessible data, or other sources of location information 170 that allows a node 105 or a target device 140 to access specific location information 170 that conveys or otherwise indicates a location having a specific location granularity.

As an example, one location information service 180 can be a GPS service that provides GPS location information 170 that indicates accurate location information to a device equipped with a GPS receiver mechanism. Another example of a location information service 180 is a database of postal address information including a street address, city, zip code, state, and country information that may be preconfigured or stored within a node 105 or target device 140 within the network 101. Location information services 180 do not need to exist externally from a node 105 or a target device 140 for purposes of this invention. That is, a location information service as defined herein can be as simple as a technique or mechanism that a program or process operating within a node 105 or target device 140, such as the location manager 150 operating within such devices, can use to obtain location information 170. As an example, a system call which the location manager 150 can invoke to obtain the currently configured network address (e.g., an IP address) of the node 105 is an example of a network address location information service 180. A filesystem may serve as a location information service 180 when the filesystem of a node 105 allows the location manager 150, as explained herein, to access location information 170 stored within a file accessible to the node 105.

Location information 170 thus generally represents values or data which conveys a location of the requesting node 105 provided by a location information service 180 with respect to some reference set of data such as other network addresses, postal address information, phone numbers, GPS coordinates or other types of information from which locations of objects in systems can be derived. Location information 170 of one type thus has a particular location granularity with respect to a node 105 to which that location information 170 pertains and with respect to other nodes such as the target device 140. In addition, the location granularity for location information 170 of one type, such as network addresses, will be different than the location granularity for location information 170 of the different type, such as zip code information. That is, the term "location granularity" as used herein refers to the differences between different types of location information 170. Location information according to this invention can typically represent a plurality of different types of location values from multiple source (i.e., nodes and/or target device(s)).

To illustrate some examples, the location granularity of GPS location information 170 is fine because GPS location information 170 provides a rather precise geographical position of a node 105 to which that GPS location information 170 relates when contrasted with zip code location information 170 that provides a rather coarse location granularity, since zip code information is accurate to determining a location within a specific town or city. Network address location information 170 provides yet another type of location granularity in that network addresses may indicate relative locations of a device such as a node 105 in a computer network 101 depending upon how much is known about the distribution of other network addresses within a particular network. As yet another example, phone number location information 170, which may be obtained from a phone number location information service 180, may provide a location granularity that defines a specific area of a city or town, but may not be as accurate or precise (i.e. may not have such a fine location granularity) as, for example, GPS location information 170. It is to be understood that each node (i.e., each intermediate node along that path of travel of the location request message and/or location signature message can add in any location information into the location signature message 162 based on the location information parameters list requested by the location requesting device.

Returning now to the discussion of step 201, since the location signature message contains location information associated with a plurality of different location information services 180, and each location information service 180 provides location information 170 having a different location granularity, the location requesting application 130 is presented with different categories of location information from different nodes within a network 101 and can thus select or choose which portions of location information are desired or required depending upon the specific purpose or use of the location information by the location requesting application 130.

Next, in step 202, the location requesting application 130 processes the location information 170 for at least one of the location information services 180 in the location signature message 162 to derive a location of the target device 140 in relation to at least one desired location granularity. Accordingly, the location requesting application 130 is able to utilize the location information 170 from within the location signature message 162 from one or more or all of the nodes 105 and possibly the target device 140 in order to determine the location of the target device 140 with a specific degree of accuracy. As an example, if precision is required in determining the location of the target device, the location requesting application 130 can rely on GPS location information reported in the location signature message 162 for each of the nodes 105-1 through 105-3 and possibly, if the location request message 160 reached the target device 140, the target device 140 itself.

In addition, since location information is collected from several nodes that are closest to the target device (and even from the target device itself if the location request message reaches the target device), then location information can be obtained such as network path information, routing path information, default router information, bandwidth information, or any other information that can be provide to place a set on nodes in context with each other such that their location (and hence the location of the target device) can be most easily ascertained. To this end, location information can include any type of data, statistics, network characteristics, quality of service characteristics, and the like that each node can provide concerning the path of either the location signature message or the location request message in to allow the recipient device to be able to deduce, calculate or otherwise determine a more accurate location of the target device.

As will be explained shortly, there may be instances in operation of embodiments of the invention in which the location request message 160 does not travel or propagate all the way to the target device 140. In such cases, the last node 105 within the network 101 that received the location request message 160 will be the closest node 105 to the target device 140 that reports location information 170. Again, depending upon the purposes of the location requesting application 130, if precision in determining a location of the target device 140 is not required, the location requesting application 130 may choose to rely on a less accurate or coarser level of location granularity provided by location information 170, such as zip code information obtained from the location signature message 162.

As briefly explained above, each node 105 (which may include the target device 140) within the communications network 101 is capable of reporting location information 170 using one or more location signature messages 162 back to the location requesting application 130. It is to be understood why it might be important for a node such as node 105-1 to report location information regarding its location when a much closer node to the target device 140 such as node 105-3 also places location information 170 into the location signature message 162. That is, if a node that is much closer to the target device 140 reports location information 170 to the location requesting application 130, is worth explaining here a purpose of providing location information for nodes 105 which are further for the target device 140. One purpose of such location information provided by all nodes 105 that are capable of providing such information is so that the location requesting application 130 can compare different location information values from different nodes (which may include location information reported by the target device 140) to determine an overall accuracy of the location information which is reported to be most close to (or actually within) the target device 140, or stated differently, which is reported to be furthest from the location requesting device 120.

As an example, consider a situation where the location requesting application 130 requires zip code information. As discussed above with respect to conventional techniques for obtaining location information, the target device 140 that is equipped to provide zip code location information 170 upon request may be improperly configured with a zip code that does not accurately reflect the actual zip code in which the target device 140 is presently positioned. As a result, the zip code location information 170 reported back may be unusable. However, using the techniques of embodiments of the invention as explained herein, a node such as node 105-3 which may be relatively close to the target device 140 (e.g., may be within a few miles if the network link to the target device 140 is a physical link such as a dial-up modem connection) and which reports its own zip code location information 170-2, will allow the location requesting application 130 to detect a discrepancy between the zip code information 170-1 provided by the target device 140 as opposed to the zip code information 170-2 provided by the network node 105-3.

As will be explained shortly, since a location signature message 162 further contains an identity of each device such as nodes and target devices that report location information, the location requesting application 130 can determine that the node 105-3 is a stationary network node such as a router or switch which is most likely configured with accurate zip code information. As a result, the location requesting application 130 can resolve the discrepancy in different zip code information (e.g., the target device 140 may report zip code which would be thousands of miles away from the zip code reported by the node 105-3) in favor of the zip code location information 170-2 provided by the node 105-3.

Figure 3:
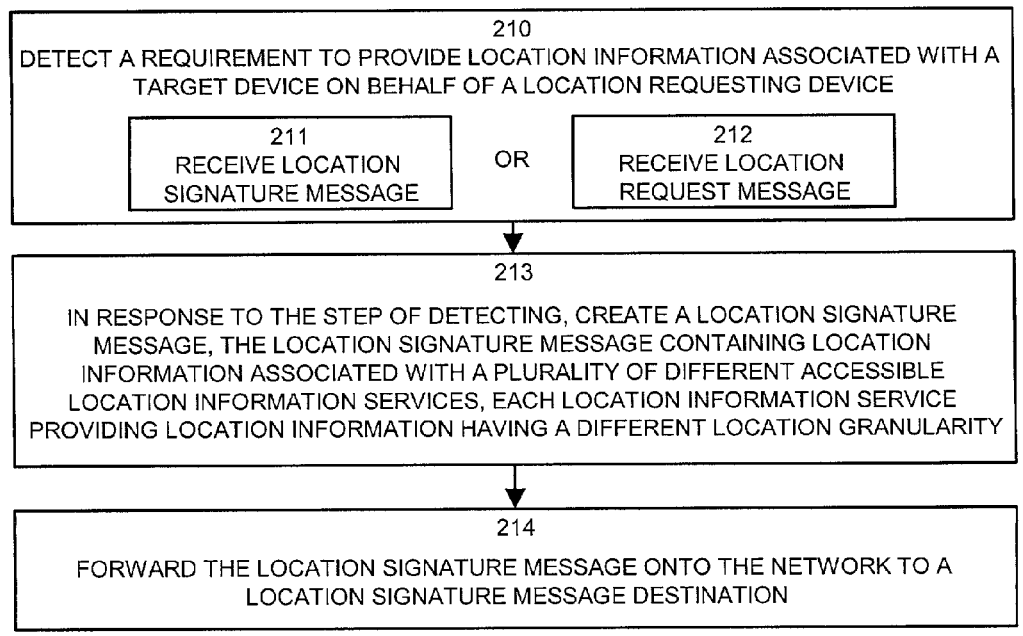
FIG. 3 is a flow chart that shows the high-level processing steps performed by a node or by a target device equipped with a location manager configured according to one example embodiment of the invention.

FIG. 3 illustrates a flow chart of high-level processing steps performed by devices such as nodes 105 and target devices 140 operating within the communications network 101 which are configured with one embodiment of the invention. Each of such devices (i.e., each node 105 and the target device 140) operates (e.g., executes, runs, interprets or otherwise performs) a location manager 150 can access respective types of location information 170 from location information services 180 which that node 105 or device 140 is capable of accessing. The processing steps shown in FIG. 3 will be explained as being performed by a location manager 150 operating within a node 105 and/or a target device 140.

In step 210, the location manager 150 detects a requirement to provide location information 170 on behalf of a location requesting device 120. As illustrated within step 210 in FIG. 3, steps 211 and 212 illustrates two mechanisms by which the location manager 150 can detect a requirement to provide location information to the location requesting device 120. Others may exist as well.

In step 211, the location manager 150 can receive a location signature message 162. In this manner, a location signature message 162 received by a node 105 operating within the communications network 101 can trigger the location manager 150 operating within that node 105 to detect a requirement that location information 170 is to be provided to the location requesting device 120 as will be explained shortly.

According to an alternative embodiment of the invention, in step 212, the location manager 150 can detect a requirement to provide location information 170 to a location requesting device 120 by receiving a location request message 160. In this alternative configuration, as the location request message 160 propagates from the location requesting device 120 towards the target device 140, each node 105 along the propagation path through the communications network 101 that receives the location request message 160 will cause that node 105 to trigger operation of the processing steps shown in FIG. 3.

Next, in step 213, in response to the step of detecting (step 210), the location manager 150 creates a location signature message 162. The location signature message 162 contains location information 170 associated with a plurality of different accessible location information services 180. Each location information service 180 can provide location information 170 having a different location granularity as explained above. In this manner, in step 213, the location manager attempts to retrieve location information 170 from all accessible location information services 180. As will be explained shortly, the location request message 160 contains a specification of location information parameters that identify what types of location information are being requested by the location requesting device 120. Based on these parameters, each node 105 will gather, obtain or otherwise collect corresponding location information 170 if that node is capable of accessing the location information service 180 that corresponds to (i.e., that can provide) the requested location information 170 for that location information parameter. Once the location manager 150 has created a location signature message 162 containing all accessible location information 170, processing proceeds to step 214.

In step 214, the location manager 150 forwards the location signature message 162 (created in step 213) onto the network 101 to a location signature message destination. The location signature message destination may be, for example, the next node 105 in the network 101 on a route or path back toward the location requesting device 120. In this manner, by processing steps 210 through 214, the location manager 152 is able to provide location information 170 of different location information services 180 and thus of different location granularities back to the location requesting device 120.

FIG. 4 illustrates an example of the contents of a location request message 160 configured according to one example embodiment of the invention. The location request message 160 includes a location request message identifier 310 which may be a flag, packet header field, TCP or UDP port number or any other indication that identifies a packet or message traveling through the communications network 101 as being a location request message 160. The source address field 311 and destination address field 312 identify the source of the location request message 160 (e.g., location requesting device 120) and destination of the location request message 160 (e.g., the target device 140). The location information destination field 313 identifies the final network location such as a network address to which the location information 170 collected within the location signature message(s) 162 is to be sent. In some embodiments of the invention, it may be the case that the device that is to receive the location information 170 may be different than the location requesting device 120 as will be explained. In other embodiments, the location information destination field 313 can be a multicast address on a LAN or WAN, such that once location information is collected, the location information 170 is transmitted onto a network using a multicast address for receipt by one or more recipient computers that subscribe to this multicast group address.

The time to return field 314 is used to maintain a numerical value that indicates how many network hops the location request message 160 is to propagate before propagation is canceled. The time to return field 314 is similar in purpose to a time to live field is used in protocols such as trace-route. As an example, when the location requesting application 130 creates the initial location request message 160-1 in FIG. 1, the location requesting application 130 may set the time to return field 314 to a value of 3. As the location request message 160 propagates through the communications network 101 from node to node, each node 105 adjusts the time to return field 314 such as by decrementing a numerical value in this field 314. As a result, when the location request message 160-1 arrives at the network node 105-1, the location manager 150-1 operating within the network node 105-1 will decrement the time to return field 314 having a value of 3 to a value of 2. Since similar processing occurs in each node 105 within the network 101, the location request message 160 will travel three network hops through the communications network 101 and will be canceled at node 105-3. As a result, the target device 140 will never receive the location request message 160 if the time to return field 314 is set to a value of 3 in the example network shown in FIG. 1. As a result of this, location information 170-3 within node 105-3 represents the most accurate or closest location information identifying locations closest to the target device 140.

In an alternative embodiment of the invention, the time to return field 314 may be a reverse time to return field. A reverse time to return field specifies a number of network hops from the destination address 312 at which point propagation of the location request message 160 should be canceled. As an example, if there are 10 network hops between a location requesting device 120 and a target device 140, if a reverse time to return value 314 is set to a value of 2, then the location request message 160 will be propagated through the network until it is only two hops away from its destination address 312, which is typically the target device 140. In this manner, the location requesting application 130 can set the time to return field value 314 such that the location request message 160 only propagates part of the way towards a specific target device 140 without actually reaching the intended target device 140.

The combined or separate location signature message field 315 within the location request message 160 indicates whether or not all nodes 105 are to include all of their location information 170 into a single location signature message 162, or if each node 105 is to produce a separate location signature message 162. In other words, the combine or separate LSM field 315 identifies how nodes 105 detect the requirement to provide location information associated with a target device on behalf of a location requesting device 120 in step 210 of the flow chart in FIG. 3. If the field 315 is marked "separate," then upon receipt of a location request message 160, a node 105 can immediately begin creation of a node-specific location signature message 162 that contains the location information 170 accessible by that node 105. After all of such location information 170 is obtained, the node 105 can forward its respective location signature message 162 back to the location requesting device 120 (or to another destination as will be explained later). In this manner, all of the nodes 105 will send a separate location signature message 162 back to the location requesting device 120 and the location requesting device 120 will receive individual location signature messages 162 for each node responding to the location request message 160.

In an embodiment where separate location signature messages 162 are returned from each node (105, 140) to a single destination (such as the location requesting device 120), the location requesting device can provide a timeout period in order to determine when processing of location information should begin. Thus, any location signature messages 162 that are received within the timeout period can be included in the algorithm(s) used to process the location information 170 contained in each location signature message 162. This avoids having the location requesting device (or other end recipient of all of the separate location signature messages) having to try to determine how many location signature messages it must "wait for" before processing. Alternatively, a location signature message count can be used to indicate how many separate location signature messages must be received (e.g., a minimum number) at the location requesting device before processing begins to pull out the location information (170, 327 in FIG. 5) from each separate location signature message 162-1, 162-2, and so forth (not shown in the figures) for processing to determine a location relative to the target device 140.

Alternatively, if the field 315 is marked "combine," then a node 105 receiving a location request message 160 will wait until it detects receipt of a location signature message 162 before obtaining location information 170 for insertion into a "combine" location signature message 162 that contains multiple sets or collections of location information 172 from each node 105.

The location information parameters field 316 contains a specification of a plurality of location information parameters X1 . . . XN that each correspond to a specific type of location information 170 that is being requested by the location requesting application 130. That is, each location information parameter X1 through XN that is specified in the field 316 indicates that the location requesting application 130 desires to receive location information 170 associated with a location information service 180 that can provide such location information should this information 170 be accessible from the service 180 at that particular node 105 in the network 101. The location requesting application 130 may specify any number of location information parameters 316.

The location information modification factors F1 . . . FN 317 represent fuzz-factors, noise, or distortion information or values that are to be applied to the location information 170 received from a respective location information service 180 prior to placing the location information 170 into a location signature message 162 for return to the location requesting device 120. Location information modification factors 317 can be specified in order to obscure a specific location of a target device 140 to a certain degree depending upon the values chosen for the location information modification factors 317. By way of example, if a location information parameter XN 316 indicates that GPS location information 170 is to be retrieved from each node 105 and from the target device 140, a corresponding location information modification factor FN 317 can be supplied in the location request message 160 that indicates by how much distance a device such as the target device 140 is allowed to modify the GPS location information 170 to somewhat obscure the actual precise location of the target device 140. Such obscurity may be desired for privacy purposes such that a particular target device 140 cannot be precisely pinpointed.

Accordingly, by applying a location information modification factor 317 to location information 170 prior to placement into a location signature message 162, a device, at its option, may desire to somewhat obscure its precise location but while still providing the requested location information to a location granularity that is acceptable to the location requesting device 120. As an example, a location modification factor 317 for GPS location information may indicate a deviation value of 300 feet is acceptable for GPS location information 170 to return to a location requesting device 120. Accordingly, even though the GPS location information service 180 can return location information 170 to the location manager 150 operating within the target device 140 to within a range of five or ten feet, by applying a location information modification factor of up to 300 feet to the precise GPS location information 170, the actual location of the target device 140 will not be accurate as perceived by the location requesting device 120 within a range closer than 300 feet. It is to be understood that location information modification factors 317 can specify values such as percentages by which a node or target device can modify location information or alternatively, such factors 317 can indicate maximum or minimum "fuzz" factors that a node 105 should use. As an example, a minimum factor 317 can specify a minimum amount of distortion to be introduced into the location information, without indicating a maximum.

The aforementioned fields 310 through 317 are illustrated by way of example only. It is to be understood that certain of these fields need not be required to accomplish the goals and principles of the present invention. As an example, the location information modification factors 317 need not be required or applied in order to accomplish the purposes of the present invention.

FIG. 5 illustrates an example of the contents of a location signature message 162 configured according to one example embodiment of the invention. The location signature message 162 in this example includes a location signature message identifier field 320 which operates in a manner similar to the location request message identifier field 310 as discussed above. Likewise, as explained above respective location request message 160, the source address fields 321 and destination address fields 322 in the location signature message 162 indicate source and destination addresses of the location signature message 162 within the network 101. The location information destination field 323 identifies the end point or destination device that is to receive the location information 170 contained within the location signature message 162 (field 326 which will be explained shortly) when complete. The location requesting device field 324 identifies the location requesting device 120 that originated the location request message 160. The location information value fields 326 Y1 . . . YN contain any accessible location information (i.e., 170 in FIG. 1) for each location information parameter X1 through XN as requested in the location information parameter fields 316 within the location request message 160. That is, for each location information parameter XN that identifies location information 170 that is desired to be received by the location requesting application 130, the location signature message 162 contains location information values YN 326 for the location information 170 for the respective location information parameters 316 that are accessible by that node 105 from the corresponding location information services 180.

Depending upon which embodiment of the invention is implemented, the location signature message 162 can contain either a single set of location information values 170 from a single node 105 (in the case of each node 105 returning a separate location signature message 162), or, if the combined field 315 was set to a "combine" value, then a single location signature message 162 may contain multiple sets of location information values 326 to hold the location information 170 from a plurality of nodes 105 and the target device 140. The location information parameters field 327 contains a copy of the location information parameters field 316 from the location request message 160 and the location information modification factors field 328 contains a copy of any location information modification factors from the location request message 160. In this manner, the fields 327 and 328 can be used when a single location signature message 162 operates in a combined mode to gather location information 170 from all nodes 105 (and possibly the target device 140) as a single location signature message 162 propagates towards location information destination 313.

Concerning the location information destination fields 313 and 323 shown in FIGS. 4 and 5, these fields specify a device in the network 101 that serves as the end all recipient device for all location information 170 collected in one or more location signature messages 162. In some implementations, the location information destination is the location requesting device 120 as explained in the aforementioned examples. However, in an alternative embodiment of the invention, the location information destination may be the target device 140 or may be a location collector device.

If the location information destination is the target device 140, embodiments of the invention operate as explained above such that nodes 105 within the network 101 receive a location request message 160 from the location requesting device 120. The location request message 160 can specify a "combine" value in the combined or separate field 315. In addition, location request message 160 can indicate a time to return value 314 of one. Accordingly, the first node 105-1 in the network 101 that receives such a location request message 160 will create a location signature message 162 and will establish a destination address 322 for the location signature message 162 to be the next hop node 105-2 on a path towards the target device 140. As a result, the location signature message 162 travels from the node 105-1 to the node 105-2. That is, the location signature message does not travel back to the location requesting device 120 but rather travels to the target device 140. Each node 105 along the path of the location signature message 162 (as it travels to the target device 140) can insert location information 170 such that the target device 140 receives a location signature message 162 containing all location information 170 for each node in the network 105 on a path to it from the location requesting device 120. When the target device 140 receives such a location signature message 162, the target device 140 can store or cache the location information values 326 (i.e., the different sets of location information 170 for each node 105 that provide such information) for future use, can apply whatever location information modification factors it desires, and so forth. In addition, the location requesting device 120 can provide a single request to the target device 140 requesting that the target device 140 provide the entire collected set of location information 170 (i.e., the set of location information values 326) back to the location requesting application 130. This may be done after applying location information modification factors 328.

In another alternative embodiment of the invention, the location information destination 313 can specify either the location requesting device 120 or the target device 140, as previously explained, and the destination address 322 of the location signature message 162 can specify a beacon device 107 (FIG. 1) operating within a communications network 101. A beacon device 107 is any type of device that can operate as a centralized return point for location signature messages 162 or alternatively, as a reference upon which a node can calculate a location information value 170 for insertion into the location signature message. As an example, when each node 105 receives a location request message 160 that contains a "separate" value for the combined or separate field 315, and further contains a location information destination field 313 having a value of either the location requesting device 120 or the target device 140, each node 105 may provide, in response to such a location request message 160, a location signature message 162 which is forwarded onto the network towards a beacon device 107. In other words, in this example, location signature messages 162 are not initially sent directly back to either the location requesting device 120 or the target device 140, but instead are sent to a centralized location information providing device referred to herein as a beacon device 107. As such a location signature message 162 propagates through the network towards the beacon device 107, and each node 105 in the network along the path towards the beacon 107 provides or inserts location information 170 into the location signature message 162.

In one embodiment, when the beacon device 107 receives a completed location signature message 162 containing sets of location information 170 in the location information values field 326, the beacon device 107 can cache or otherwise store the location information 170 (i.e., 326) and if required, can also forward the location information 170 to the location information destination 313 such as the original location requesting device 120.

In this manner, embodiments of the invention allow a centralized location collecting computer system to collect location information concerning a variety of different target devices 140. Such location information concerning a particular target device 140 can be timestamped at the beacon 107 for use by multiple location requesting devices 120 which may require such location information in the future. Also, since location signature messages 162 are returned to a common beacon device, location information is returned on paths relative to this device, so that location information for two different target devices can be compared to determine which target device 140 is further from the beacon and/or the location requesting device.

In another configuration, a beacon device 107 can be used as a reference for location information related to a node 105. As an example, a location information parameter 316, 327 might specify that a node 105 is to provide its network hop distance from a particular beacon device 107. Upon receipt of such a location signature message 162 containing such a "beacon distance" parameter, the node 105 can perform a trace route, ping, or other similar function from itself to the beacon device 107 specified by the location information parameter 327. Upon receiving the result (i.e., the network hop distance between the beacon and the node 105), the node 105 can insert this information as the requested location information 326 into the location signature message 162. In this manner, the location information 326 returned from each node 105 can provide a set of network location metrics (i.e., network hops or packet travel time distances) based on a common reference beacon point, which is the beacon device in this example.

Besides network hops counts to a beacon device, other metric measurements that a node can collect in relation to a beacon are ping times to reach the beacon, bandwidth rates to the beacon, and other such network metrics. In this manner, each node (possibly including the target device) can indicate a location information "metric" relative to one or more beacon devices. For multiple beacons, there can be separate location information parameters that identify each beacon that each node is to obtain a particular metric in relation to for reporting within the location signature message 162.

Figure 6:
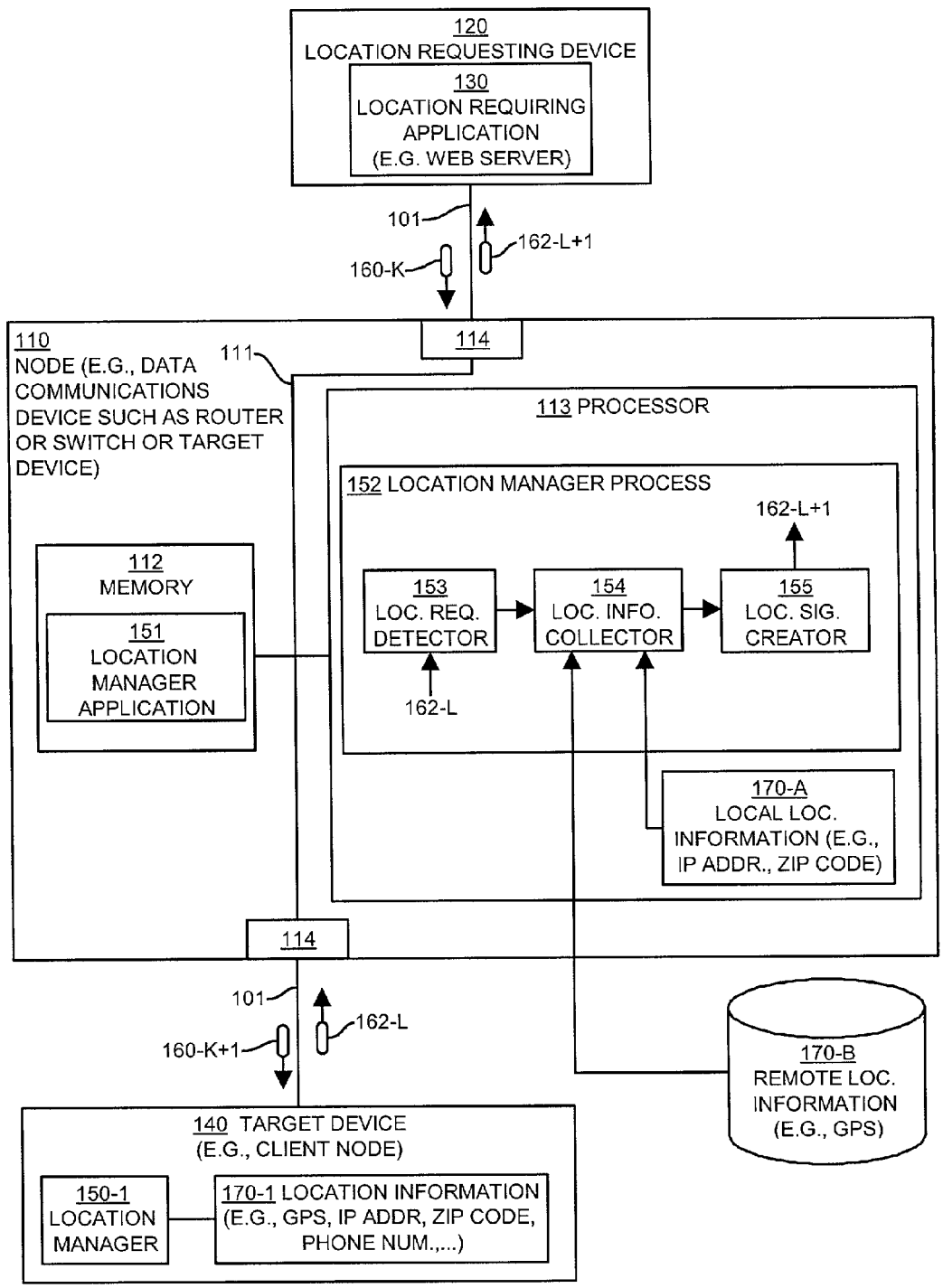
FIG. 6 illustrates an example architecture of a node (or target device) configured according to one embodiment of the invention.

FIG. 6 illustrates a more detailed architecture of a node 105 such as a data communications device or a target device configured according to one embodiment of the invention. The node 105 in this example embodiment of the invention includes an interconnection mechanism 111 such as a data bus and/or other circuitry that interconnects a memory 112, a processor 113 and one or more communications interfaces 114.

The memory 112 may be any type of volatile or non-volatile memory or storage system such as computer memory (e.g., random access memory (RAM), read-only memory (ROM), or other electronic memory), disk memory (e.g., hard disk, floppy disk, optical disk and so forth), or other memory device. The memory 112 is encoded with logic instructions (e.g., software code) and/or data that form a location manager application 151 configured according to embodiments of the invention. In other words, the location manager application 151 represents software code, instructions and/or data that embody the processing logic steps and operations as explained herein and that reside within memory or storage or within any computer readable medium accessible to the node 105.

The processor 113 represents any type of circuitry or processing device such as a central processing unit, microprocessor or application-specific integrated circuit that can access the location manager application 151 encoded within the memory 112 over the interconnection mechanism 111 in order to execute, run, interpret, operate or otherwise perform the location manager application 151 logic instructions. Doing so forms a location manager process 152. In other words, the location manager process 152 represents one or more portions of the logic instructions of the location manager application 151 while being executed or otherwise performed on, by, or in the processor 113 within the node 105 or the target device 140. The location manager 150 in FIG. 1 collectively represents either one or both of the location manager application 151 and the location manager process 152.

This example embodiment of the node 105 also illustrates an example software architecture of a location manager process 152 (and hence the location manager application 151) which includes a location requirement detector 153, a location information collector 154 and a location signature creator 155. These components 153 through 155 interoperate to perform the operations of embodiments of the invention as explained herein.

Generally, the location requirement detector 153 detects and processes location request and signature messages 160, 162 as they arrive at the node 105. As explained above, receipt of a location request message 160 in some embodiments of the invention can be an indication of a requirement to provide location information 170 to a location information destination (i.e., as specified in field 313 of the location request message 160 illustrated in FIG. 4). In addition, the location requirement detector 153 can detect location signature messages 162 arriving at the node 105 on an interface 114 and can examine the combined or separate field 325 to determine if the location manager process 152 is supposed to include location information 170 from this node 105 (i.e., if the field 325 is marked with a "combine" value). Also as illustrated in FIG. 6, the location requirement detector 153, upon detection of a location request message 160-K, can decrement or otherwise adjust the time to return field 314 thus creating a location request message 160-K+1 which is forwarded onto the network towards the destination address 312 (FIG. 4).

The location information collector 154 is capable of examining the specification of location information parameters 316 (for a location request message 160) or 327 (or a location signature message 162) in order to collect, obtain or gather location information 170 which is either locally stored (e.g., 170-A) within the node 105 or which is remotely obtained (e.g., 170-B) from a location information service 180 which is external to the node 105.

The location signature creator 155 inserts all of the location information 170 obtained by the location information collector 154 into the location information values fields 326 within a location signature message 162 and is capable forwarding this message over an interface 114 to a destination address 322 (FIG. 5).

Further details of the operation an example embodiment of the invention will now be explained with respect to the flow charts of processing steps shown in FIGS. 7 through 10. Such flow charts illustrate a detailed operational example of the creation of a location request message 160, as well as processing of such a message within the nodes 105 and within a target device 140 resulting in return of one or more location signature messages 162 to the location requesting device 120.

Figure 7:
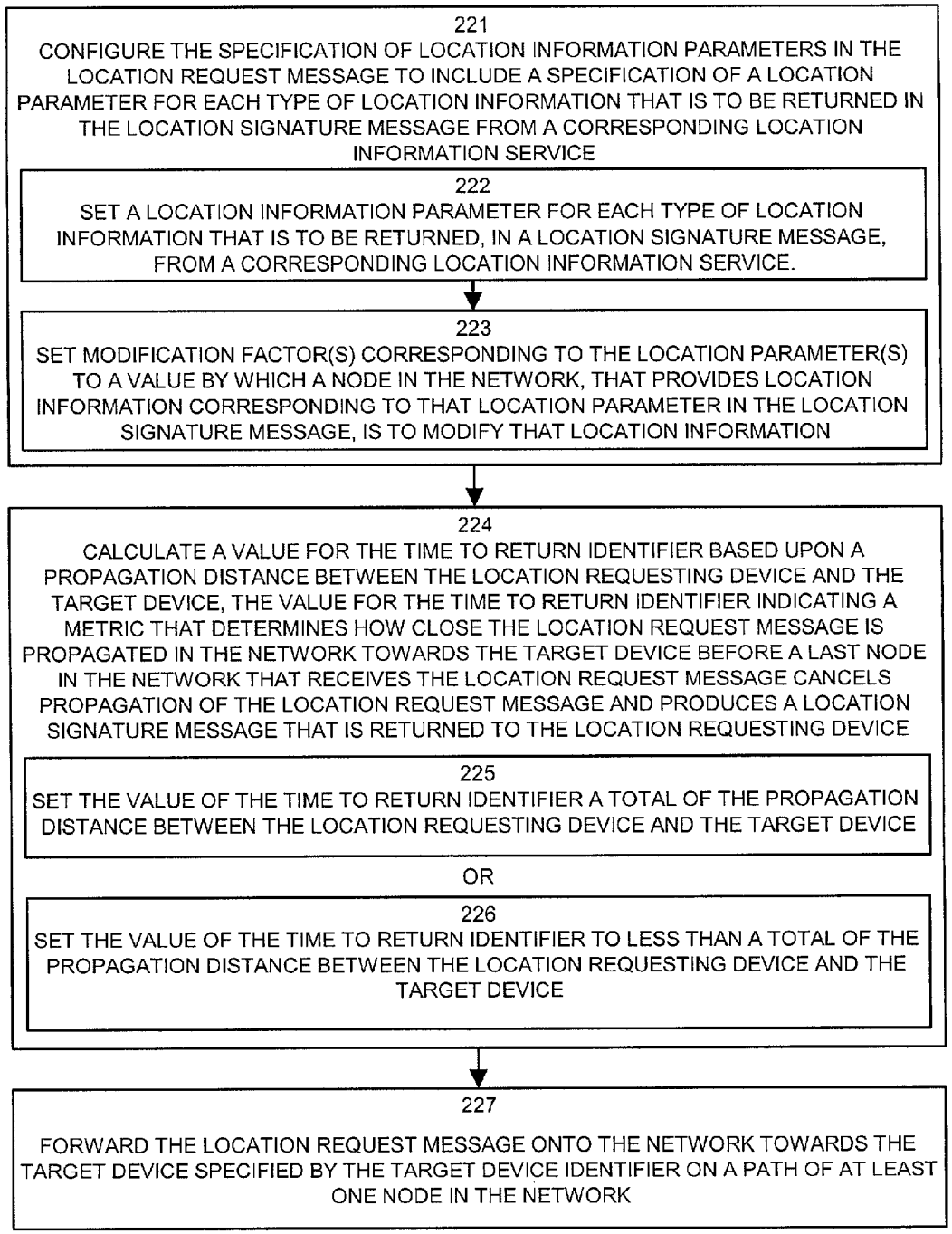
FIG. 7 is a flow chart of processing steps configured according to one embodiment of the invention to generate a location request message.

FIG. 7 illustrates an example of processing steps performed by the location requesting application 130 to generate a location request message 160.

In step 221, the location requesting application 130 configures a specification of location information parameters in the location request message 160. To do so, the location requesting application 130 includes a specification of a location parameter for each type of location information 170 that is to be returned in a location signature message 162 (one or more of such messages) from a corresponding location information service 180. The sub-steps 222 and 223 illustrate examples of processing required to configure a specification of location information parameters for a location request message 160.

In step 222, the location requesting application 130 specifies or sets a location information parameter for each type of location information that is to be returned, in a location signature message 162, from a corresponding location information service 180. Accordingly, once the location requesting application 130 determines or otherwise becomes aware of what types of location information it desires to retrieve concerning a location of the target device 140, in step 222 the location requesting application 130 can identify the location information parameters X1 . . . XN corresponding to such desired types of location information 170 and can configure such parameters as a specification of location information parameters 316 within the location request message 160.

Next, in step 223 the location requesting application 130 sets location information modification factors 317 F1 . . . FN corresponding to the location information parameters 316 to a value by which a node 105 (i.e., in the network), that provides the location information 170 corresponding to that location parameter 316 into the location signature message 160, is to modify that location information 170. In other words, in step 223, the location requesting application 130 indicates any modification factors 317 F1 . . . FN that nodes are to use in order to distort or inject noise into the location information 170 obtained by those nodes 105.

As an example, if a location information parameter 316 configured in step 222 indicates that telephone number location information is to be obtained for each node and the target device 140 within the network 101 (i.e., returned in a location signature message 162), the location information modification factors 317 corresponding to the phone number location information 170 may indicate that the last four digits of the phone number are to be erased within the location information 170 such that the specific or actual phone number of the target device 140 in any other nodes 105 configured with such location information 170 will be hidden or masked from the location requesting application 130. However, since the modification factors 317 for phone number information do not modify the first six digits of a phone number including area code and prefix, the location requesting application 130 is still provided with relevant phone number location information 170 from which it may derive the specific town or area in which the target device 140 and/or nodes 105 reside.

After steps 221 through 223 are complete, processing proceeds to step 224 to define other items within the location request message 160.

In step 224, the location requesting application 130 calculates a value for the time to return identifier 314 based upon a propagation distance between the location requesting device 120 and the target device 140. The value for the time to return identifier 314 indicates a metric the determines how close (e.g., coming network tops) the location request message 160 is propagated in the network 101 towards the target device 140 and for a last node 105 in the network 101 that receives the location request message 160 that cancels propagation of the location request message 160 and produces a location signature message 162 that is returned to the location requesting device 120 in this example. In other words, in step 224, the location requesting application 130 makes a determination if the location request message 160 is to be propagated all the way to the target device 140 such that the target device 140 also provides location information 170 within a location signature message 162.

Depending upon the purpose of the location requesting application 130, such an application may be aware that certain target devices 140 are incapable of understanding a location request message 160. In other words, embodiments of the invention are capable of determining location information related to a target device 140 that is not equipped with a location manager 150. In such cases, the location requesting application 130 can specify a reverse time to return identifier 314 that indicates how many network hops away from the target device 140 the location request message should propagate 160 (e.g., 1 hop) before being converted into a location signature message 162. If a reverse time to return identifier 314 is set to "1", then the location request message 160 will propagate through the network 101 all the way to the node 105 closest to the target device 140, which is node 105-3 in the example illustrated in FIG. 1.

Alternatively, the location requesting application 130 can set the time to return identifier 314 to a value that equals or exceeds a propagation distance between the location requesting device 120 in the target device 140 such that the location request message 160 always reaches the target device 140 allowing the target device 140 to report location information 170 in a location signature message 162. These two alternative configurations are illustrated in step 225 or 226.

In step 225, one embodiment of the location requesting application 130 sets the value of the time to return identifier 314 to a total of the propagation distance between the location requesting device 120 and the target device 140 such that the target device reports location information 170.

Alternatively, in step 226, another embodiment of the invention sets the value of the time to return identifier 314 to less than a total of the propagation distance between the location requesting device 120 and the target device 140 such that the location request message 160 stops short of the target device 140 and thus location information returned in one or more location signature messages 162 is only obtained from nodes 105 within the network rather than from the target device 140 itself.

Upon completion of creation of a location request message 160, processing proceeds to step 227 at which point the location requesting application 130 forwards the location request message 160 onto the network 101 towards the target device 140 specified by the target device identifier (e.g., destination address field 312) on a path of nodes 105 in the network 101. In this manner, the location request message 160 begins its path through the network 101 towards the target device 140 and is processed as explained herein.

Figure 8:
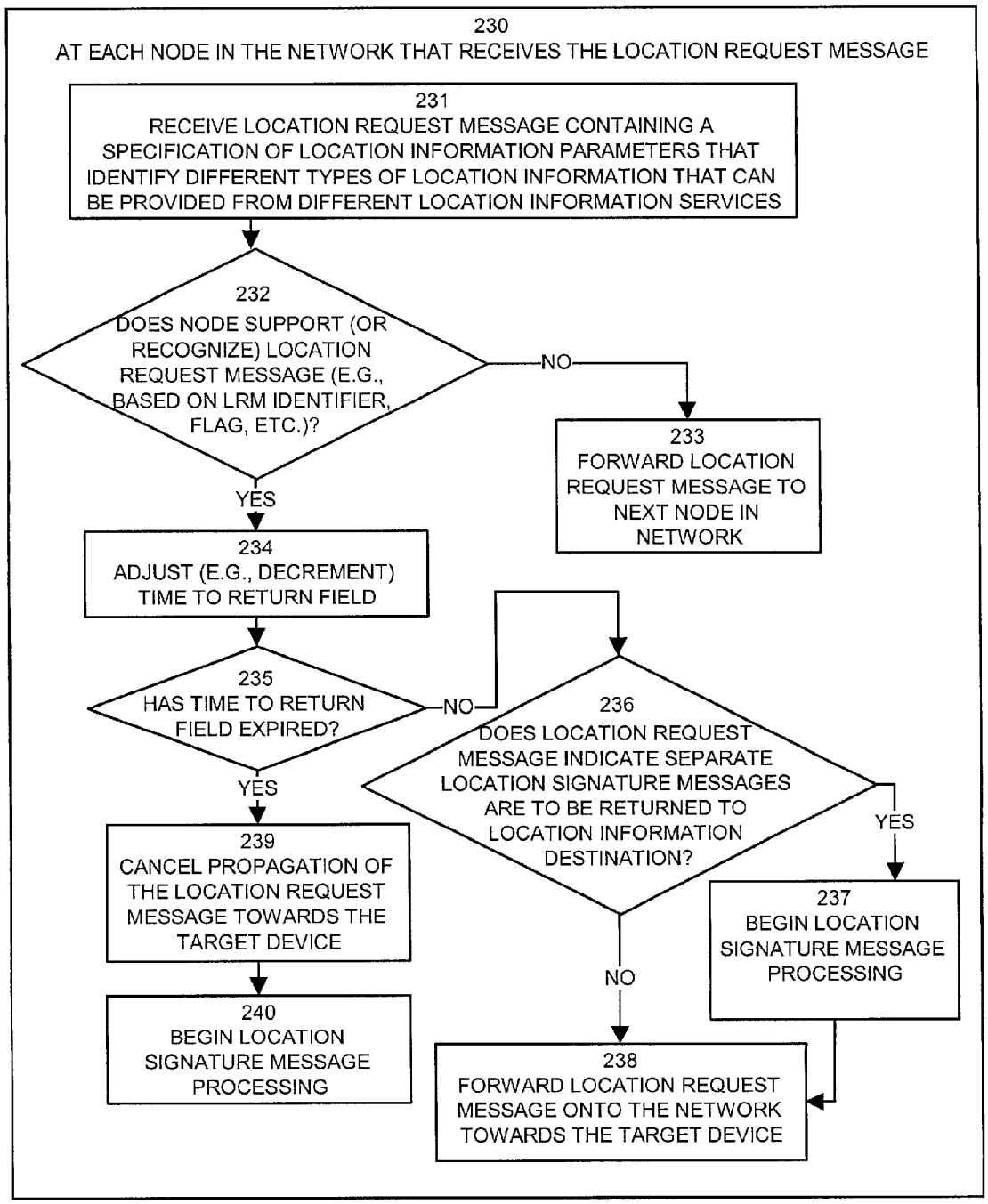
FIG. 8 is a flow chart of processing steps configured according to one embodiment of the invention to process a location request message in each node or in a target device.

FIG. 8 is a flow chart of processing steps that show one example of location request message 162 processing that takes place in each node 105 (and in the target device 140) according to one example embodiment of the invention. Generally, as illustrated by step 230, the location manager 150 operating in each node 105 in the network 101 that receives a location request message 160 performs the processing in FIG. 8.

In step 231, the location manager 150 receives a location request message 160 containing a specification of location information parameters 316 that identify different types of location information 170 that can be provided from different location information services 180.

Next, in step 232, the location manager 150 determines if the node 105 supports or recognizes the location request message based on the location request message identifier field 310. In other words, the node 105 can detect the location request message in step 232, for example, by identifying the message on a specific TCP or UDP port number or by a header field or flag in a packet that is designated as the location request message identifier 310 (FIG. 4).

If the node 105 is not equipped with a location manager process 150, then the node does not support processing according to embodiments of the invention and thus does not recognize the location request message 160 as being anything other than a regular packet of data passing through the communications network 101. As such, processing proceeds to step 233 from step 232 at which point the node 105 forwards the location request message 160 to the next node 105 in the network 101. However, if a node 105 is equipped with a location manager 150 configured according to embodiments of the invention, the node supports location request message processing and processing proceeds from step 232 to step 234.

In step 234, the location manager adjusts (e.g., decrements) the time to return field 314 contained within the location request message 160. As discussed above, the time to return field 314 may be a count or numerical value that indicates how many network hops between nodes 105 the location request message 160 should take before a node 105 receiving the location request message no longer forwards the message to another node in the network. In an alternative embodiment of the invention, the time to return field 314 can be a reverse time to return field in which case the initial value specifies how many hops away from the target node 140 the location request message 160 should travel prior to its propagation being canceled. In another alternative, this field is not required and the location request message 160 is simply continually routed towards its destination address so that it reaches the target device 140. It is thus to be understood that the time to return field 314 is a feature of certain embodiments of the invention that allows an implementer of this system to control how far a location request message travels onto the network towards a destination (e.g., towards the target device 140) before stopping. In some instances, it may be the case that a system designer does not want the location request message 160 to actually reach the destination, in which can the time to return field 314 can be set to a value lower than the total propagation path (e.g., network hops) towards the target device. As noted above however, embodiments of the invention are not limited to using or including this field. This example embodiment however does include the use of this field for completeness of this discussion.

In step 235, the location manager process 152 determines if the time to return field 314 has expired. If the time to return field 314 is not a reverse time to return field, then its value will be adjusted (e.g., decremented) within each node 105 in step 234. Upon reaching an expiration value such as "0," step 235 will detect that the time to return field 314 has expired and processing will proceed to step 239. Alternatively, if the time to return field is not yet expired, processing will proceed to step 236.

Considering the processing path to step 239 (the time to return field has expired), the location manager process 152 cancels propagation of the location request message 160 towards the target device 140. It is to be understood that the location manager process 152 that decrements the time to return field 314 to its final or last value may be the location manager process 152 operating within the target device 140 itself.

Thereafter, in step 240, the location manager process 152 begins location signature message processing at step 251 in FIG. 9, which will be explained shortly.

Returning attention now to step 235, if the time to return field 314 has not expired, processing proceeds to step 236 at which point the location manager process 152 determines if the location request message 160 indicates that separate location signature messages 160 are to be returned to the location information destination field 313 as specified in the location request message 160. In other words, in step 236, the location manager process 152 consults the combined or separate field 315 to determine if each node 105 is to return a separate location signature message 162 to the location requesting device 120. If the location request message 160 in step 236 indicates that separate location signature messages 162 are to be returned to the location information destination 313 (FIG. 4), then processing proceeds to step 237 in order to begin location signature message processing in step 251 in FIG. 9. Note that in addition to beginning location signature message processing in step 237, processing also proceeds to step 238 either after or in conjunction with the processing in step 237 (i.e., in conjunction with the processing shown in FIG. 9).

Alternatively, in step 236 if the location request message combined or separate field 315 indicates that separate location signature messages 162 are not to be returned to the location information destination 313, processing proceeds to step 238.

In step 238, the location manager process 152 forwards the location request message 160 onto the network 101 further towards the target device 140. As illustrated in FIG. 6, the location manager process 152 produces the location request message 160-K+1 by processing the location request message 160-K. In this example embodiment of the invention, other than message addressing information in a packet header, one difference between the location request message 160-K and 160-K+1 is that the time to return field 314 has been adjusted to account for receipt of this location request message 160 in this particular node 105.

In this manner, as explained above with respect to the processing steps illustrated in FIG. 8, each node 105 within the network is capable of processing location request messages 160 and forwarding such messages toward the target device 140 if such messages 160 are not expired. Expiration of a location request message 160 triggers creation of the location signature message 162 which in certain embodiments of the invention is returned to the location requesting device 120. In addition, in cases in which the location request message 160 has not yet expired, the processing in FIG. 8 performs a check in step 236 to see if each node is supposed to return a separate location signature message 162 in response to receipt of the location request message 160, and if so, performs location signature message processing as will be explained next in FIG. 9.

Figure 9:
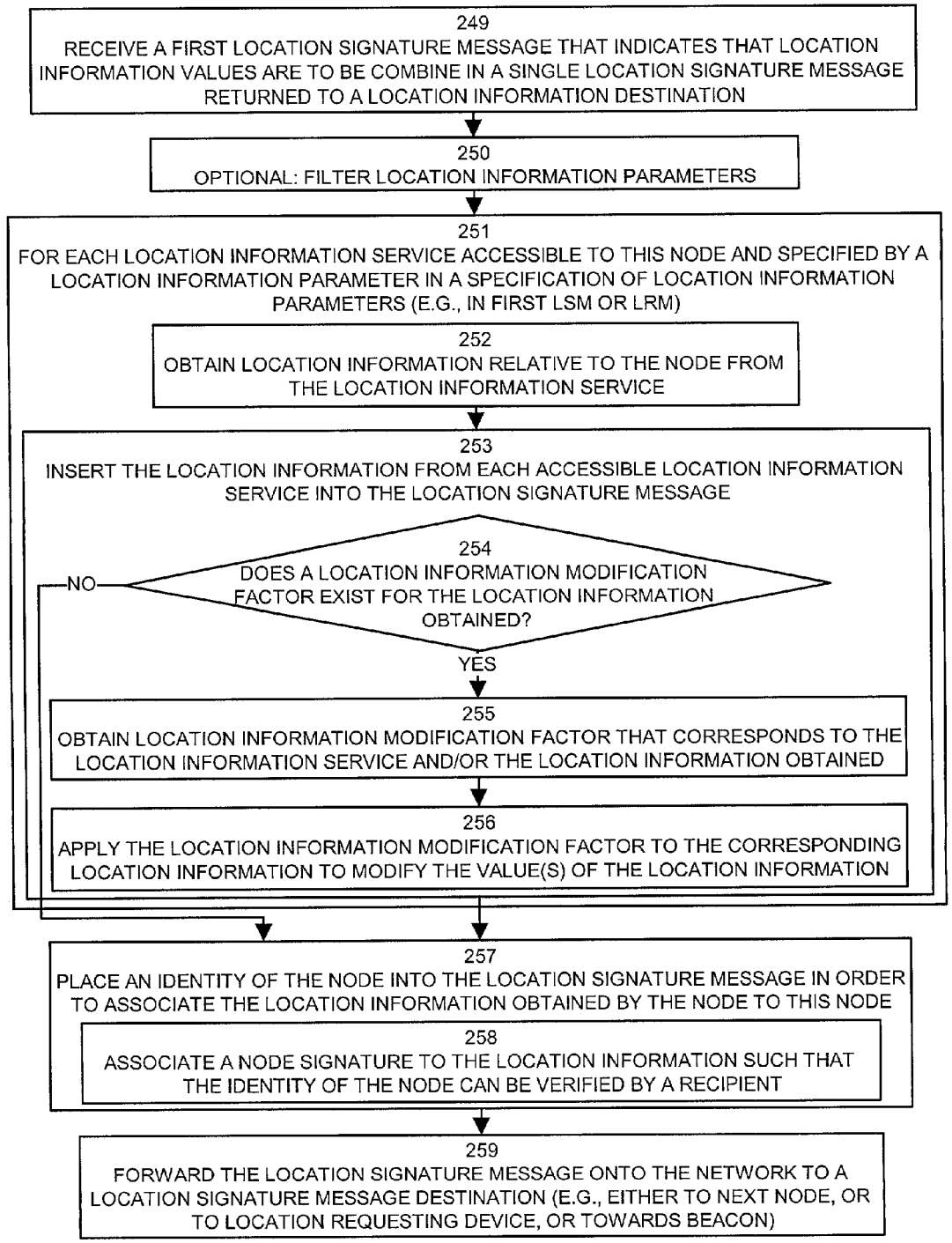
FIG. 9 is a flow chart of processing steps configured according to one embodiment of the invention to generate a location signature message.

FIG. 9 is a flow chart of an example of processing steps performed by the location manager process 152 operating within the node 105 in order to generate a location signature message 162 according to one example embodiment of the invention.

Step 249 is a processing step that covers the situation in which a location signature message 162 is received by a node 150 and contains an indication within the combined or separate field 325 that indicates that a single location signature message is to be returned to the location information destination 313 identified within the location signature message 162. As a result of this processing step, if the processing in FIG. 8 proceeds to forward at location request message 160 through each node 105 in the communications network 101 without causing each node 105 to generate a separate individual location signature message 162, upon expiration of the time to return field 314, location signature message processing is started and the location signature message 162 will contain a "combine" value in the combined or separate location signature message field 325. As a result of this "combine" value, as this location signature message 162 propagates through the network towards the location information destination 323, each node 105 that recognizes such a message in step 249 proceed to process this message according to the remaining steps shown in FIG. 9.

In step 250, which is an optional step and is explained for this example embodiment of the invention, the location manager process 152 filters the location information parameters. By filtering, what is meant is that the node that is responding to the location signature message can chose, for example, to ignore certain location information parameters for a variety of reasons. As an example, if one location information parameter asks for GPS information and a node processing this iteration of processing steps is located in a secure facility, the node may chose not to provide the GPS information into the location signature message 162 if the requesting device (i.e., identified by the location information destination field 323 is not on a list of validated devices that is allowed to know the GPS coordinates of this node. In other words, this optional step of filtering can allow a node 105 (e.g., such as the target device 140) to decide not to provide certain requested location information, even though that information is available to that node 105.

In step 251, the location manager process 152 (i.e., the location requirement detector 153 in FIG. 6) enters a processing loop which takes place for each location information service 180 that is accessible to the node 105 and that is specified by a location information parameter 316 (in the case of creation of a new location signature message 162) or 327 (in the case of receiving a "combine" location signature message 162) in the specification of location information parameters (i.e., and that was not filtered out in step 250). In other words, the processing defined by step 251 is a loop that takes place for each type of requested location information 170 that is accessible by the location manager process 152 operating within this node 105.

In step 252, the location manager process 152 (e.g., the location information collector 154 in FIG. 6) obtains location information relative to the node 105 from the location information service 180 for the particular location information parameter 316, 327 that has been processed in this iteration of the loop defined by step 251. As explained above, there may be many different types of location information services 180. Some may be internally accessible data structures (e.g., 170-A) that the location information collector 154 has access to within the node 105 or alternatively, location information services 180 may provide remote location information 170-B (FIG. 6) from a source or service 180 outside of the node 105. For purposes of this invention, it makes no difference where the location information 170 comes from or how it is obtained.

As an example, GPS location information may require activation, by the location manager process 152 in step 252 of a GPS receiver mechanism in order to capture the current longitude and latitude and altitude coordinates of the node 105 at the time of processing step 252. Alternatively, in step 252, the location manager process 152 might access ZIP code or other postal address information that is statically or locally configured within the node 105.

In step 253, the location manager process 152 inserts the location information 170 for each accessible location information service 180 into the location signature message 162. Details of this processing are illustrated according to one embodiment of the invention by step 254 through 256.

In step 254, the location manager process 152 determines if a location information modification factor 328 (or 317 in the case of creation of the first or separate individual location signature messages 162) exists for the location information 170 obtained in step 252. If a location information modification factor FN 317, 328 exists that corresponds to the location information parameter 316, 327 XN for which the location information 170 was obtained (step 252), processing proceeds to step 255.

In step 255, the location manager process 152 obtains the value of the location information modification factor that corresponds to the location information service 180 and/or the location information 170. As discussed previously, the location information modification factor FN may be, for example, a numerical value, a percentage or any other information that indicates an amount, metric or technique by which the location manager process 152 can adjust the specific value 326 YN of the location information 170 in order to somewhat obscure or mask the precise location of the node 105 for that location information 170.

In step 256 the location manager process 152 applies the location information modification factor FN to the corresponding location information 170 value 326 YN in order to modify the value YN 326 of the location information 170 as appropriate. It is to be understood that the processing of steps 255 and 256 is optional and if location information modification factors 317 are absent from the location request message 160 for some or all parameters, then no such modification will take place for the corresponding location information 170. In addition, it is to be understood that some location information modification factors can exist for certain location information parameters while other parameters will not have a corresponding location information modification factor.

After application of the location information modification factors, in if no such location information modification factors exist in step 254, processing exits step 253 and returns for another iteration of steps 252 through 256 within the loop defined by step 251. This process (step 251) repeats for each location information service accessible to the node 105 and for which a location information parameter 316 or 327 is specified (i.e., is requested by the location requesting device 120). Upon completion of collecting all location information 170 accessible to the node 105, processing exits the loop defined by step 251 in proceeds to step 257.

In step 257, the location manager process 152 (i.e., the location signature creator 155) places an identity of the node 105 into the location signature message 162 in order to associate the location information 170 obtained by the node 105 to this node's identity.

As shown in step 258, in one embodiment of the invention, the location manager process 152 associates a node signature to the location information 170 such that the identity of the node 105 can be verified by a recipient of the location signature message 162. As an example, the location manager process 152 can digitally sign the location signature message by including a signature associated with the node 105.

Next, in step 259, the location manager process 152 forwards the location signature message 162 onto the network 101 towards the location signature message destination that, in a typical implementation, is the next node 105 on a path back towards the location requesting device 120. Generally, what is meant by forwarding to the next node 105 is that the location manager process 152 forward the location signature messages 162 onto the network using conventional packet transmission techniques such that the message 162 is routed towards the address specified in the destination address field 322. In an alternative embodiment of the invention, as discussed above with respect to each node 105 generating a separate location signature message 162, the processing of step 259 can forward the location signature message 162 directly back to the location requesting device 120. In yet another alternative embodiment of the invention, the location signature message can be forwarded towards a beacon device 107 existing within the network 101. In such a case, as the location signature message 162 propagates towards the beacon device 107, each node 105 along the path towards the beacon can process the location signature message 162 as explained in FIG. 9 beginning in step 250 in order to provide incremental location measurements of the location signature message's propagation, beginning at a node 105 that is close to the target device 140 (or from the target device 140 itself).

In this manner, embodiments of the invention can produce location signature messages 162 that contain location information of a plurality of different types. In addition, embodiment of the invention allow for the collection of location information by multiple nodes with a network thus providing for multiple location references that originate from individual node positions and thus allow for cross-referencing accuracy of location information provided from potentially unreliable sources such as the target device 140 itself.

Figure 10:
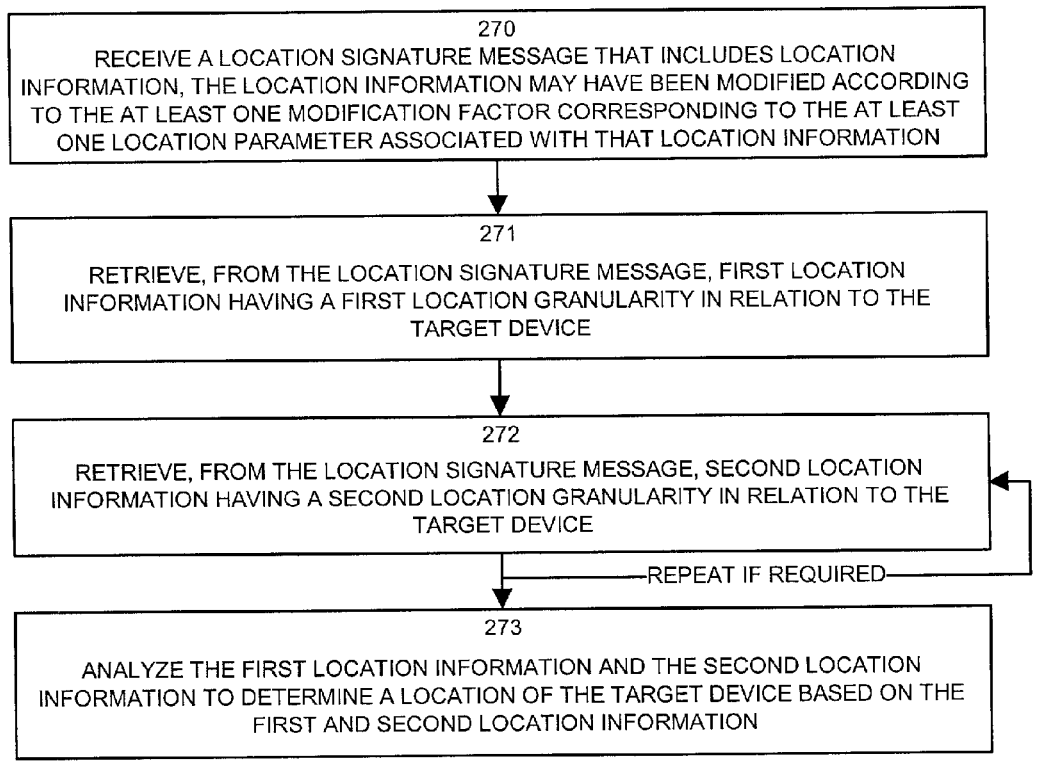
FIG. 10 is a flow chart of processing steps performed by a location requesting device to process a returned location signature message according to one embodiment of the invention.

FIG. 10 is a flow chart of processing steps performed by the location requesting application 130 operating within the location requesting device 120 upon receipt of one or more location signature messages 162 according to one embodiment of the invention.

In step 270, the location requesting application 130 receives a location signature message (one or more) 162 that includes location information 170. The location information may have been modified according to one or more modification factors 328 corresponding to location parameters associated with that location information 170.

In step 271, the location requesting application 130 retrieves, from the location signature message 162 (or from all of such messages received within a certain time period), first location information 170 having a first location granularity in relation to the target device 140.

Next, in step 272, the location requesting application 130 retrieves, from the location signature message(s) 162, second location information 170 having a second location granularity in relation to the target device 140. In other words, in steps 271 and 272, the location requesting application 130 retrieves the various types of location information from the set of one or more location signature messages 162 that are received in response to creating the location request message 160 as previously explained.

The processing of steps 272 can be repeated for any other location information (e.g., third, fourth, etc.) 170 contained within the location signature message 162, as may (or may not) be required by the location requesting application 130. As such, it is not necessary for purposes of this invention to process all location information within the location signature message, even though additional portions of location information are present. After processing step 272 for any number of required iterations to obtain the location information desired, processing proceeds to step 273.

In step 273, the location requesting application 130 analyzes the first location information (obtained in step 271) and the second location information (obtained in step 272) and any other location information obtain from repeating step 272 to determine a location of the target device 140 based on the first and second location information 170. In other words, based on the collection of different types of location information related to different nodes 105 in the network which may include the target device 140 itself, the location requesting application 130 analyzes or otherwise processes the various portions of location information 170 in order to most accurately deduce or compute the location of the target device 140 according to a desired level of location granularity.

In this manner, by collecting multiple types of location information from multiple sources within a network environment, embodiments of the invention can provide more reliable and more accurate locations of target devices 140 depending upon specific purpose of the location information required and retrieved. As an example, each node 105 may have provided ZIP code location information 170. The target device 140 may have provided phone number information but may not have been configured with the zip code information and thus this location information was inaccessible to the target device 140. However, if the intent of the location requesting application 130 is to verify or obtain the most accurate location information with respect to the town in which the target device 140 is located, the phone number of the target device 140 as reported in a location signature message 162 from the target device 140 can be cross-referenced or checked against the zip code information provided by the node 105 with an identity that is closest to the target device 140, such as the node 105-3 in FIG. 1. This is an example of how embodiments of the invention are capable of cross-referencing or cross-comparing different portions of location information 170 which may be the same or different types in order to more accurately determine the location of the target device 140.

Those skilled in the art will understand that there can be many variations made to the embodiments explained above while still achieving the same objective of those embodiments and the invention in general. As an example, some nodes 105 within the network 101 may be capable of accessing many types of location information 170 while other nodes 105 may have very little if any location information that can be included within a location signature message 162.

In addition, for embodiments that forward the location signature message 162 towards a beacon device 107 in the network 101, the location signature message 162 can include a time to return field that serves a similar purpose as the time to return field 314 contained within the location request message 160. As such, such a location signature message 162 propagates towards the beacon device 107 and the time to return field is adjusted at each node. Upon expiration of such a time to return field, the node in which the location signature message 162 expires may examine the location information destination field 323 and may forward the entire location signature message 162 as it appears at that time within that node 105 towards the location information destination which can be, for example, the location requesting device 120.

In a variation of the aforementioned alternative embodiment, a location signature message 162 can be created by a node 105 according to the techniques explained above and can include a destination address 322 of the beacon device 107. In such cases, each node on the path from the originator of a location signature message 162 towards the beacon device that is "location signature message aware" (i.e., that is equipped with the invention) can include location information for the requested parameters. In addition, location signature message aware nodes can sense or otherwise detect when the location signature message 162 is X hops (e.g., one or more) away from the beacon address. The value X can be specified in a field (e.g., such as a time to return field) within the location signature message 162. Upon such a condition (i.e., upon the location signature message 162 arriving at a node 105 X hops from the beacon device, where X can be defined as the value for in a field in the location signature message, not specifically shown in the figures), the node 105 can alter the destination address 322 of the location signature message 162 to be the value of the location information destination field 323. In such cases, the location signature message 162 is essentially redirected in its propagation path. In addition, another flag can be included in the location signature message 162 that indicates that no further location information is to be obtained or entered into this location signature message 162.

As a result of this variation, a location signature message 162 collects location information from each node between a node that creates the location signature message 162 and the beacon, and then, just prior to reaching the beacon, the location signature message 162 is redirected towards its final destination. In embodiments in which each node separately creates and returns a unique location signature message 162, each location signature message 162 can propagate, from each node 105 on the path of the location request message 160, towards the beacon device 107 in order to collect location information for that node 105 relative to the beacon. Then, upon reaching (or almost reaching) the beacon 107, each location signature message 162 can be redirected towards a single final destination for processing. Using such techniques, location information concerning each node can be determined relative to a beacon, and since the node from which each location signature message 162 originates are all existent on a path towards the target device 140 (and may include the target device 140 itself), then the sum total of location information received from each node in relation to the beacon device can be used by a location determination algorithm to deduce or otherwise approximate or calculate the location of the target device. By providing a time to return field in a location signature message 162 sent towards a beacon device 107, the location signature message 162 does not actually reach the beacon 107 thus avoiding issues of congestion of location signature message traffic at a particular beacon 107.

It is to be understood that in another variation of embodiments of the invention, a beacon device 107 can be a fictitious or imaginary device. As such, certain nodes in the network (e.g., routers or switches) can be configured to advertise themselves as having a beacon address. As a result, these nodes advertising beacon addresses are the beacon location in the network to which location signature message(s) 162 are sent towards in the aforementioned embodiments that utilize beacon devices 107.

In addition, according to another alternative embodiment of the invention, upon generation of location signature messages 162 as explained in FIG. 9, each node 105 can generate a separate location signature message 162 for each type of location information 170 requested by each different location information parameter X1 . . . XN. As a result, multiple location signature messages 162 may be produced for each node 105 (or from the target device 140 which is considered a node for the purposes of explanation herein). In the case of the production of multiple location signature messages 162 from a single node 105, some of the location signature messages 162 may be forwarded to one destination such as the location requesting device 120, while others may be sent on the network towards another device such as a beacon device 107.

In cases in which a location signature message includes a time to return field 314 (not shown in FIG. 5), the purpose of the location information destination field 323 is to specify a final destination device which is to receive all location information collected by the location signature message 162. As a result, the location signature message 162 can take a different path across the network 101 such as towards a beacon device 107 rather than taking the most direct path between the target device 140 in the location requesting device 120. As a result, different location signature messages 162 produced by the same node 105 will end up containing collections of different types of location information from other nodes on different paths other than only those nodes in the path between the location requesting device 120 target device 140.

In yet another alternative, a client target device 140 can collect location information itself and then process and ship part or all of this information to a pre-configured/dynamically-updated list of servers. In this embodiment, the target device can be treated as the location requesting device for the purposes of the aforementioned discussion.

Such variations are intended to be covered by the scope of this invention. As such, the foregoing description of embodiments of the invention is not intended to be limiting. Rather, any limitations to the invention are presented in the following claims.

What is claimed is:

1. In a location requesting device, a method for obtaining location information related to a target device, the method comprising the steps of:

Transmitting a location request message onto a network towards the target device, the location request message requesting location information in relation to the target device, wherein the location request contains a specification of location information parameters that identify different types of location information requested by the location request message, each different type of location information corresponding to location information that can be provided from a different location information service, wherein the location request message contains a target device identifier and contains a time to return identifier, and wherein the step of transmitting the location request message comprises step of: configuring the specification of the location information parameters in the location request message to include a specification of the location information parameter for each type of location information that is be returned in a location signature message from a corresponding location information service, Specially, the limitation calculating a value for the time to return identifier based upon a propagation distance between the location requesting device and the target device, the value fro the time to return identifier indicating a metric that determines how close the location request message is propagated in the network toward the target device before a node in the network that receives the location request message cancels further propagation of the location request message and produces a location signature message that is returned to the location requesting device; and forwarding the location request message onto the network towards the target device specified by the target device identifier; receiving a location signature message, the location signature message containing location information associated with a plurality of different location information services, each location information service providing location information having a different location granularity in relation to the target device; and processing the location information for at least one of the location information services in the location signature message to device a location of the target device in relation to at least one desired location granularity.

2. The method of claim 1 wherein the step of calculating a value for the time to return identifier comprises the steps of:
setting the value of the time to return identifier to a total of the propagation distance between the location requesting device and the target device, such that the step of transmitting the location request message onto the network towards the target device causes nodes in the network to propagate the location request message to the target device, and such that the target device creates a location signature message for return to the location requesting device.

3. The method of claim 1 wherein the step of calculating a value for the time to return identifier comprises the steps of:
setting the value of the time to return identifier to be less than a total of the propagation distance between the location requesting device and the target device, such that the step of transmitting the location request message onto the network towards the target device causes nodes in the network to propagate the location request message a distance less than required to reach the target device, and such that a node in the network other than the target device creates a location signature message for return to the location requesting device.

4. The method of claim 1 wherein the step of configuring the specification of location information parameters comprises the step of:
setting a location information parameter for each type of location information that is to be returned, in the location signature message, from a corresponding location information service that is accessible to each node in the network, such that each node in the network that is capable of producing a location signature message containing location information for that location parameter provides such location information in a location signature message in response to receiving the location request message.

5. The method of claim 4 wherein the location request message includes at least one modification factor corresponding to at least one location parameter in the specification of location information parameters, and wherein the step of configuring the specification of location information parameters comprises the step of:
setting the at least one modification factor corresponding to the at least one location parameter to a value by which a node in the network, that provides location information corresponding to that location parameter in the location signature message, is to modify that location information.

6. The method of claim 5 wherein the step of receiving a location signature message comprises the step of:
receiving a location signature message that includes location information that is modified according to the at least one modification factor corresponding to the at least one location parameter associated with that location information.

7. The method of claim 1 wherein the location signature message contains location information inserted into the location signature message from a plurality of different nodes in a communications network, each node having a different location proximity to the target device.

8. The method of claim 7 wherein the location information inserted into the location signature message is location information obtained from each node:
i) at which the location request message is received on a network path from the location requesting device to the target device;
ii) which is capable of responding to the location request message with a location signature message; and
iii) for which location information is accessible by that node from a respective location information service that corresponds to a respective location information parameter specified in the location request message.

9. The method of claim 1 wherein the step of processing comprises the steps of:
retrieving, from the location signature message, first location information having a first location granularity in relation to the target device;
retrieving, from the location signature message, second location information having a second location granularity in relation to the target device;
analyzing the first location information and the second location information to determine a location of the target device based on the first and second location information.

10. The method of claim 1 wherein
the location request message includes a specification of location information parameters that identify location information that may be available from location information services to nodes in the network existing on a path between the location requesting device and the target device; and wherein the location signature message contains location information corresponding to respective location parameters that have a value indicating that the location requesting device is requesting that location information and for which nodes in the network existing on the path between the location requesting device and the target device are capable of access the location information from a location information service corresponding to the respective location parameters.

11. The method of claim 10 wherein the different portions of location information corresponding to different location information services provide different location granularities with respect to the location of the target device, the different location granularities including at least one of postal location information, phone number information, global positioning information, and network location information.

12. In a node in a computer network, a method for providing location information, the method comprising the steps of:

detecting a requirement to provide location information on behalf of a location requesting device, wherein the step of detecting the requirement to provide location information comprises the step of receiving, on the network, a location request message containing a specification of location information parameters that identify different types of location information, that can be provided from different location information services, and which, if accessible to the node, are to be inserted into a location signature message for forwarding onto the network to the location signature message destination, wherein the location request message contains a target device identifier and contains a time to return identifier and wherein the step of receiving a location request message comprises the steps of:

adjusting a value of the time to return identifier in the location request message;

determining if the value of the time to return identifier indicates that the location request message has propagated on the network far enough towards the target device; and if the value of the time to return identifier indicates that the location request message has propagated on the network far enough towards the target device, canceling further propagation of the location request message towards the target device; and if the value of the time to return identifier indicates that the location request message has not propagated on the network far enough towards the target device, forwarding the location request message onto the network towards the target device specified by the target device identifier;

in response to the step of detecting, creating a location signature message, the location signature message containing location information associated with a plurality of location information services accessible to the node, each location information service providing location information having a different location granularity in relation to a target device; and forwarding the location signature message onto the network to a location signature message destination.

13. The method of claim 12 wherein the step of receiving, on the network, a location request message comprises the steps of:

detecting that the location request message includes an indication that separate location signature messages are to be sent to the location signature message destination, and in response to the step of detecting, forwarding the location request message onto the network towards the target device specified by the target device identifier and proceeding to process the steps of creating a location signature message and forwarding the location signature message onto the network to a location signature message destination, such that the location signature message destination receives a separate location signature message from each node that detects a requirement to provide location information.

14. The method of claim 12 wherein the step of detecting the requirement to provide location information comprises the step of:

receiving a first location signature message, the first location signature message containing a specification of location information parameters that identify different types of location information, that can be provided from different location information services, and which, if accessible to the node, are to be inserted into the location signature message created in the step of creating for forwarding onto the network to the location signature message destination.

15. The method of claim 14 wherein the first location signature message includes first location information and wherein the step of creating a location signature message comprises the step of:

obtaining second location information from each accessible location information service specified by a location information parameter in the specification of location information parameters contained in the first location signature message;

combining the first location information from the first location signature message and the second location information into a second location signature message, such that the second location signature message contains location information in relation to the target device from the node and at least one previous node on a network path towards the location signature message destination.

16. The method of claim 12 wherein the step of creating a location signature message comprises the steps of:

obtaining location information relative to the node from each accessible location information service specified in a specification of location information parameters; and inserting the location information from each accessible location information service into the location signature message.

17. The method of claim 16 wherein the step of inserting comprises the steps of:

placing an identity of the node into the location signature message in order to associate the location information obtained by the node for all location information services accessible to the node with the identity of the node.

18. The method of claim 16 wherein the location information obtained from each location information service corresponds to location information obtained from those location information services that are accessible to the node for each respective location information parameter specified in a specification of location information parameters.

19. The method of claim 16 wherein the location information obtained from different location information services provides a different granularity of location with respect to the location of the node in relation to the target device.

20. The method of claim 16 wherein the step of inserting the location information into the location signature message comprises the steps of:
  obtaining at least one location information modification factor that corresponds to at least one location information service specified in the specification of location information parameters; and
  applying the at least one location information modification factor to corresponding location information obtained from the location information service in order to modify values of the location information from the location information service.

21. The method of claim 12 wherein the step of creating a location signature message comprises the steps of:
  associating a node signature to the location information contained in the location signature message such that the identity of the node associated with the location information can be verified by a recipient of the location information.

22. The method of claim 12 wherein a destination of the location signature message is a location requesting device.

23. The method of claim 12 wherein a destination of the location signature message is a target device.

24. The method of claim 12 wherein a destination of the location signature message is a beacon device.

25. The method of claim 24 wherein the step of forwarding the location signature message onto the network to a location signature message destination comprises the steps of:
  determining if the value of the time to return identifier indicates that a location signature message has propagated on the network far enough towards a beacon device; and
  if the value of the time to return identifier indicates that the location signature message has propagated on the network far enough towards a beacon device, redirecting the location signature message towards a location information destination.

* * * * *